(12) United States Patent
Kojima et al.

(10) Patent No.: US 12,126,284 B2
(45) Date of Patent: Oct. 22, 2024

(54) ELECTRIC MOTOR CONTROL METHOD AND ELECTRIC MOTOR SYSTEM

(71) Applicant: Nissan Motor Co., Ltd., Kanagawa (JP)

(72) Inventors: Tetsuro Kojima, Kanagawa (JP); Kengo Fujiwara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 130 days.

(21) Appl. No.: 18/043,414

(22) PCT Filed: Aug. 28, 2020

(86) PCT No.: PCT/JP2020/032781
§ 371 (c)(1),
(2) Date: Feb. 28, 2023

(87) PCT Pub. No.: WO2022/044300
PCT Pub. Date: Mar. 3, 2022

(65) Prior Publication Data
US 2023/0327592 A1    Oct. 12, 2023

(51) Int. Cl.
*H02P 27/02* (2016.01)
*H02P 21/10* (2016.01)
*H02P 21/18* (2016.01)
*H02P 21/22* (2016.01)
*H02P 27/08* (2006.01)

(52) U.S. Cl.
CPC ............. *H02P 21/18* (2016.02); *H02P 21/10* (2013.01); *H02P 21/22* (2016.02); *H02P 27/08* (2013.01)

(58) Field of Classification Search
CPC .......... H02P 27/02; H02P 21/18; H02P 21/22; H02P 21/10; H02P 27/08; B60L 15/2054
See application file for complete search history.

(56) References Cited

U.S. PATENT DOCUMENTS

| 2008/0218111 A1 | 9/2008 | Okamura | |
| 2014/0001991 A1* | 1/2014 | Nishibata | B60L 15/2054 318/400.23 |
| 2020/0343844 A1* | 10/2020 | Shouji | H02P 27/02 |

FOREIGN PATENT DOCUMENTS

| JP | 2006-320039 A | 11/2006 |
| JP | 2013-183558 A | 9/2013 |
| JP | 2017-221056 A | 12/2017 |
| JP | 2019-187097 A | 10/2019 |

\* cited by examiner

*Primary Examiner* — Cortez M Cook
(74) *Attorney, Agent, or Firm* — Osha Bergman Watanabe & Burton LLP

(57) ABSTRACT

An electric motor control method for controlling an electric motor by voltage phase control performed based on a voltage norm command value representing a magnitude of a voltage to be supplied to the electric motor and a voltage phase command value representing a phase of the voltage. The method including: acquiring a required time required for calculating a final command value of a voltage applied to the electric motor by the voltage phase control according to a command value calculation model for calculation by using a rotation speed parameter related to a rotation speed of the electric motor; detecting the rotation speed parameter; changing the detected rotation speed parameter based on the required time; and calculating the final command value by using the changed rotation speed parameter according to the command value calculation model.

7 Claims, 12 Drawing Sheets

ELECTRIC MOTOR CONTROL METHOD AND ELECTRIC MOTOR SYSTEM

TECHNICAL FIELD

The present invention relates to an electric motor control method and an electric motor system.

BACKGROUND ART

An operation of an electric motor in recent years is controlled by pulse width modulation. In addition, the electric motor may be controlled in an overmodulation state in which a modulation rate of the pulse width modulation is set to a value larger than 1. The overmodulation state is a rectangular wave state in which a waveform of a voltage applied from an inverter to the electric motor is substantially a rectangular wave by increasing the modulation rate.

In the overmodulation state, since a voltage norm of electric power supplied from the inverter to the electric motor is saturated, a phase of the voltage applied from the inverter to the electric motor is substantially a controllable parameter. On the other hand, in a non-overmodulation state in which the modulation rate is 1 or less, both the voltage norm and the voltage phase are controllable. Therefore, when the electric motor is controlled in the overmodulation state, controllability for the electric motor is reduced as compared with a case where the electric motor is controlled in the non-overmodulation state. As a result, for example, when a rotation speed of the electric motor changes suddenly, an overcurrent may flow in the electric motor.

Accordingly, a technique of preventing the overcurrent that occurs when the rotation speed of the electric motor changes suddenly is known. For example, JP2006-320039A discloses that when an electric motor is controlled in an overmodulation state, a rotation speed of the electric motor is detected, and a voltage applied from an inverter to the electric motor is corrected according to the detected rotation speed of the electric motor.

SUMMARY OF INVENTION

The electric motor control method disclosed in JP2006-320039A is intended to appropriately control an amount of a current flowing through the electric motor when the rotation speed of the electric motor changes suddenly in the overmodulation state by correcting the voltage applied to the electric motor according to the rotation speed of the electric motor, as described above.

However, in the control method, a response delay that occurs between the detection of the rotation speed and the application of the voltage to the electric motor according to the detected rotation speed of the electric motor is not considered. Therefore, in the control method, when the rotation speed of the electric motor changes suddenly in the overmodulation state, the overcurrent may still occur in the electric motor. In addition, if excessive compensation is performed on the voltage applied to the electric motor in order to reliably prevent the overcurrent, the voltage applied to the electric motor is insufficient in a normal situation other than a case where the rotation speed of the electric motor changes suddenly. Therefore, in the electric motor control method disclosed in JP2006-320039A, the electric motor may not be appropriately controlled.

An object of the present invention is to provide an electric motor control method and an electric motor system capable of appropriately controlling an electric motor even in an overmodulation state by taking into consideration a response delay that occurs until a voltage is applied to the electric motor.

One aspect of the present invention is an electric motor control method for controlling an electric motor by voltage phase control performed based on a voltage norm command value representing a magnitude of a voltage to be supplied to the electric motor and a voltage phase command value representing a phase of the voltage. The method including: acquiring a required time required for calculating a final command value of a voltage applied to the electric motor by the voltage phase control according to a command value calculation model for calculation by using a rotation speed parameter related to a rotation speed of the electric motor; detecting the rotation speed parameter; changing the detected rotation speed parameter based on the required time; and calculating the final command value by using the changed rotation speed parameter according to the command value calculation model.

DESCRIPTION OF EMBODIMENTS

Hereinafter, an embodiment of the present invention will be described with reference to the accompanying drawings.

Figure 1:
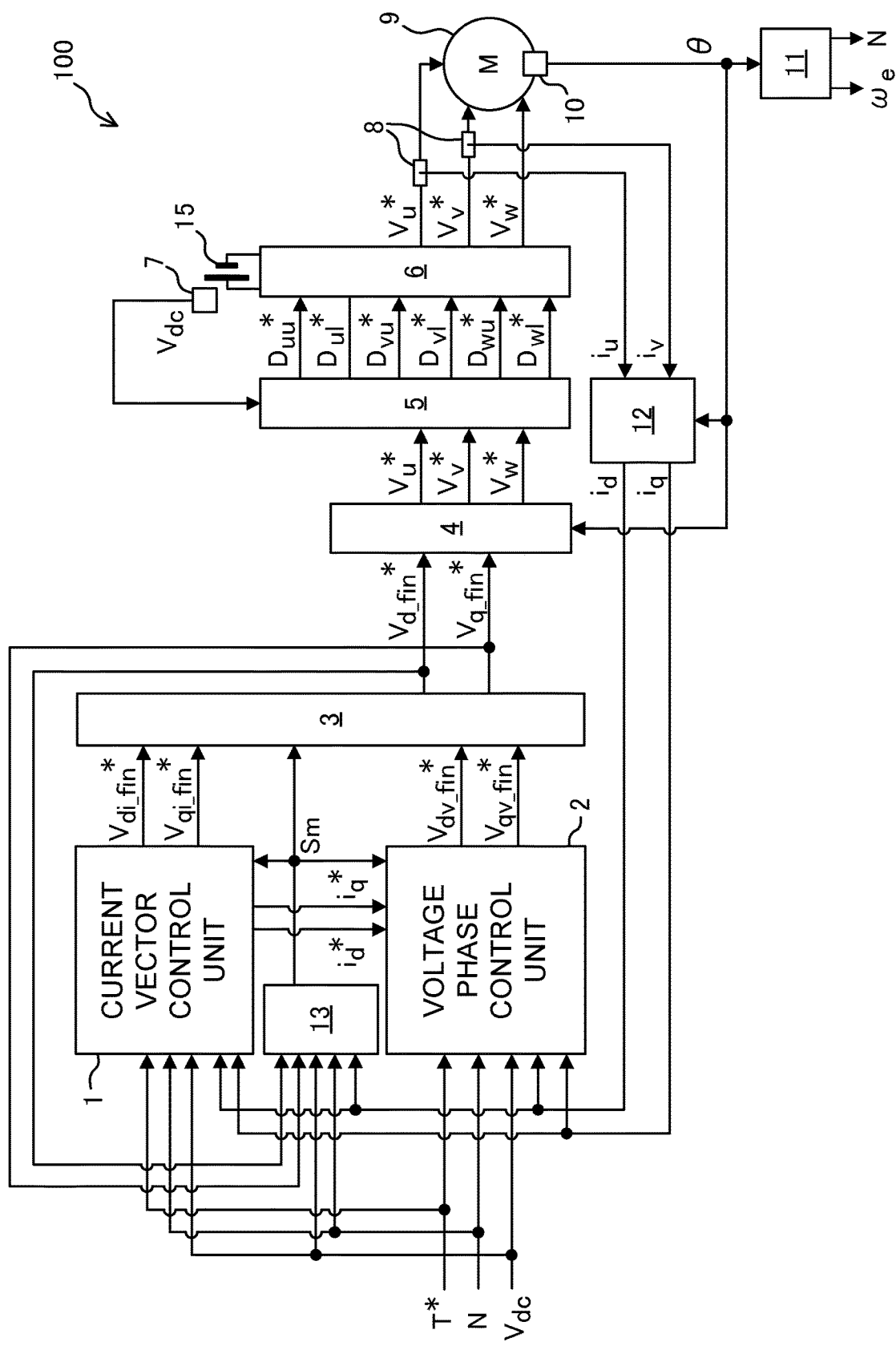
FIG. 1 is a block diagram illustrating a configuration of an electric motor system according to a first embodiment.

FIG. 1 is a block diagram illustrating a configuration of an electric motor system according to a first embodiment. As illustrated in FIG. 1, an electric motor system 100 includes an electric motor 9 to be controlled, a circuitry that controls the electric motor 9, a detector that detects a parameter necessary for controlling the electric motor 9, and a battery 15. Specifically, the electric motor system 100 includes a current vector control unit 1, a voltage phase control unit 2, an output controller 3, a converter 4, a pulse width modulation signal generator 5, and an inverter 6. Further, the electric motor system 100 includes a battery voltage detector 7, a current detector 8, a rotor detector 10, a rotation speed calculator 11, a converter 12, a control mode switching determination unit 13, and the like.

Units constituting the electric motor system 100 excluding the electric motor 9 are control devices for the electric motor 9 configured to control the electric motor 9. The battery voltage detector 7, the current detector 8, and the rotor detector 10 are each a detector that detects a parameter necessary for controlling the electric motor 9. The current vector control unit 1, the voltage phase control unit 2, and the control mode switching determination unit 13 constitute a controller (control unit). The controller is, for example, a computer including a central processing unit (CPU), a read-only memory (ROM), a random access memory (RAM), or an input/output interface (I/O interface). The controller is configured to determine a control mode of the electric motor 9, change the control mode of the electric motor 9 as necessary, and control an operation of the electric motor 9 in the determined control mode. In addition, the controller is programmed to execute processing of implementing the above in each predetermined calculation cycle. In addition, the controller, the output controller 3, the converter 4, the pulse width modulation signal generator 5, the inverter 6, the rotation speed calculator 11, and the converter 12 are circuitries that control the electric motor system 100.

The electric motor 9 according to the present embodiment is an interior permanent magnet (IPM) type synchronous motor including multi-phase windings. In the present embodiment, the windings of the electric motor 9 have three phases, i.e., U-phase, V-phase, and W-phase. That is, the electric motor 9 is a three-phase synchronous motor. In addition, the electric motor 9 is driven by pulse width modulation control. The electric motor system 100 is to be incorporated in, for example, an automobile. In an automobile in which the electric motor system 100 is incorporated, the electric motor 9 can function as a driving force source and/or a generator of the automobile.

The current vector control unit 1 executes current vector control. The current vector control is one control mode of the electric motor 9. In the current vector control, a vector related to a current supplied to the electric motor 9 (hereinafter referred to as a current vector) is controlled. In the current vector control, the current vector is adjusted such that a torque generated in the electric motor 9 converges to a target value (hereinafter referred to as a torque target value T*).

More specifically, the current vector control unit 1 receives inputs of the torque target value T*, a rotation speed N [rpm] of the electric motor 9, and a DC voltage $V_{dc}$ of the battery 15. In addition, a d-axis current $i_d$ and a q-axis current $i_q$ of the electric motor 9 are fed back to the current vector control unit 1. Then, the current vector control unit 1 calculates a d-axis voltage command value $V_{di\_fin}*$ and a q-axis voltage command value $V_{qi\_fin}*$ based on these inputs. The d-axis voltage command value $V_{di\_fin}*$ and the q-axis voltage command value $V_{qi\_fin}*$ in the current vector control are input to the output controller 3. In the current vector control, the electric motor 9 is controlled based on the d-axis voltage command value $V_{di\_fin}*$ and the q-axis voltage command value $V_{qi\_fin}*$, so that the torque generated in the electric motor 9 converges to the torque target value T*.

The d-axis voltage command value $V_{di\_fin}*$ is a command value for a d-axis voltage in the current vector control. Similarly, the q-axis voltage command value $V_{qi\_fin}*$ is a command value for a q-axis voltage in the current vector control.

The current vector control unit 1 calculates a d-axis current target value $i_d*$ and a q-axis current target value $i_q*$ in the process of generating the d-axis voltage command value $V_{di\_fin}*$ and the q-axis voltage command value $V_{qi\_fin}*$. The d-axis current target value $i_d$ is a target value of a d-axis component in the current vector. Similarly, the q-axis current target value $i_q*$ is a target value of a q-axis component in the current vector. The d-axis current target value $i_d*$ and the q-axis current target value $i_q*$ are output to the voltage phase control unit 2.

In addition, a specific configuration of the current vector control unit 1 and a method of calculating the d-axis voltage command value $V_{di\_fin}*$ and the q-axis voltage command value $V_{qi\_fin}*$ in the current vector control will be described in detail later.

The voltage phase control unit 2 executes voltage phase control. The voltage phase control is one control mode of the electric motor 9. In the voltage phase control, a phase of a voltage supplied between phases of the electric motor 9 (hereinafter referred to as a phase-to-phase voltage) is controlled. In the voltage phase control, the phase of the phase-to-phase voltage is adjusted such that the torque generated in the electric motor 9 converges to the torque target value T*.

More specifically, the voltage phase control unit 2 receives inputs of the torque target value T*, the rotation speed N of the electric motor 9, the DC voltage $V_{dc}$ of the battery 15, the d-axis current target value $i_d*$, and the q-axis current target value $i_q*$. In addition, the d-axis current $i_d$ and the q-axis current $i_q$ are fed back to the voltage phase control unit 2. Then, the voltage phase control unit 2 outputs a d-axis voltage command value $V_{dv\_fin}*$ and a q-axis voltage command value $V_{qv\_fin}*$ to the output controller 3 based on these inputs.

The d-axis voltage command value $V_{dv\_fin}*$ is a command value for a d-axis voltage in the voltage phase control. Similarly, the q-axis voltage command value $V_{qv\_fin}*$ is a command value for a q-axis voltage in the voltage phase control. A specific configuration of the voltage phase control unit 2 and a method of calculating the d-axis voltage command value $V_{dv\_fin}*$ and the q-axis voltage command value $V_{qv\_fin}*$ in the voltage phase control will be described in detail later.

The d-axis voltage command value $V_{di\_fin}*$ and the q-axis voltage command value $V_{qi\_fin}*$ in the current vector control and the d-axis voltage command value $V_{dv\_fin}*$ and the q-axis voltage command value $V_{qv\_fin}*$ in the voltage phase control are input to the output controller 3. In addition, a control mode signal Sm is input to the output controller 3 as a determination result from the control mode switching determination unit 13. Then, the output controller 3 selects, based on the control mode signal Sm, any one of the current vector control and the voltage phase control as the control mode of the electric motor 9 to be executed. The output controller 3 outputs a d-axis voltage command value and a q-axis voltage command value in the selected control mode to the converter 4 as a d-axis final voltage command value $V_{d\_fin}*$ and a q-axis final voltage command value $V_{q\_fin}*$, respectively. The d-axis final voltage command value $V_{d\_fin}*$ is a final command value of a voltage applied in a d-axis direction of the electric motor. Similarly, the q-axis final voltage command value $V_{q\_fin}*$ is a final command value of a voltage applied in a q-axis direction of the electric motor 9. A configuration of the output controller 3 and generation of the control mode signal Sm will be described in detail later.

The converter 4 converts a voltage command value in a dq-axis coordinate system into a voltage command value in a UVW three-phase coordinate system. That is, the converter 4 converts the d-axis final voltage command value $V_{d\_fin}*$ and the q-axis final voltage command value $V_{q\_fin}*$ into three-phase voltage command values ($V_u*$, $V_v*$, and $V_w*$). The three-phase voltage command values are command values for determining voltages of the UVW phases. The converter 4 performs coordinate conversion based on an electric angle θ of the electric motor 9 as shown in the following Equation (1). The converter 4 outputs the three-phase voltage command values to the pulse width modulation signal generator 5.

[Equation 1]

$$\begin{bmatrix} V_u^* \\ V_v^* \\ V_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} V_{d\_fin}^* \\ V_{q\_fin}^* \end{bmatrix} \quad (1)$$

The pulse width modulation signal generator 5 generates a pulse width modulation signal ($D_{uu}*$, $D_{ul}*$, $D_{vu}*$, $D_{vl}*$, $D_{wu}*$, and $D_{wl}*$) based on the three-phase voltage command values and the DC voltage $V_{dc}$ of the battery 15. The pulse width modulation signal (hereinafter referred to as a PWM signal) is a signal of driving a power element provided in the inverter 6. Therefore, the pulse width modulation signal is input to the inverter 6.

The inverter 6 converts, based on the PWM signal, the DC voltage $V_{dc}$ of the battery 15 into three-phase AC voltages ($V_u$, $V_v$, and $V_w$) for driving the electric motor 9. The three-phase AC voltages are applied to the electric motor 9. Accordingly, currents flow through the phases of the electric motor 9. The currents flowing through the U phase, the V phase, and the W phase are AC currents $i_u$, $i_v$, and $i_w$ (hereinafter, referred to as three-phase AC currents), respectively. Accordingly, the electric motor 9 is driven based on the PWM signal and generates the torque.

The battery voltage detector 7 detects a voltage of the battery 15 connected to the inverter 6. In the present embodiment, the battery voltage detector 7 detects the DC voltage $V_{dc}$ of the battery 15. The detected DC voltage $V_{dc}$ is output to the current vector control unit 1, the voltage phase control unit 2, and the control mode switching determination unit 13.

The current detector 8 detects a current supplied from the inverter 6 to the electric motor 9. In the present embodiment, the current detector 8 detects at least two-phase AC currents among the three-phase AC currents ($i_u$, $i_v$, and $i_w$). In the present embodiment, the current detector 8 detects the U-phase AC current $i_u$ and the V-phase AC current $i_v$. Detected values of the three-phase AC currents are input to the converter 12.

The rotor detector 10 detects the electric angle θ of the electric motor 9. The detected electric angle θ is input to the converter 4 and the converter 12. In addition, the electric angle θ is input to the rotation speed calculator 11.

The rotation speed calculator 11 calculates the rotation speed N (mechanical angle rotation speed) and an electric angular velocity $\omega_e$ of the electric motor 9 based on a change amount of the electric angle θ in a unit time $\Delta t_{Nave}$. The rotation speed N and the electric angular velocity $\omega_e$ are rotation speed parameters related to the rotation speed N of the electric motor 9. The rotation speed parameter is the rotation speed N or a parameter calculated by using the rotation speed N. More specifically, the rotation speed calculator 11 detects the rotation speed N of the electric motor 9. Then, the rotation speed calculator 11 calculates the electric angular velocity $\omega_e$ by performing unit conversion of the rotation speed N using the number of pole pairs of the electric motor 9. The unit time $\Delta t_{Nave}$ is a calculation cycle (operation cycle) of the rotation speed calculator 11, and is a predetermined value determined in advance. The rotation speed N is input to the current vector control unit 1, the voltage phase control unit 2, and the control mode switching determination unit 13. The electric angular velocity $\omega_e$ is input to the voltage phase control unit 2.

The converter 12 converts the three-phase AC currents detected by the current detector 8 into a current in the dq-axis coordinate system by using the electric angle θ detected by the rotor detector 10. In the present embodiment, since the current detector 8 detects the U-phase AC current $i_u$ and the V-phase AC current $i_v$, the converter 12 performs the above coordinate conversion according to the following Equation (2).

[Equation 2]

$$\begin{bmatrix} i_d \\ i_q \end{bmatrix} = \begin{bmatrix} \cos\theta & -\sin\theta \\ \sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ -i_u - i_v \end{bmatrix} \quad (2)$$

The control mode switching determination unit 13 determines a control mode of the electric motor 9 suitable for an operating state (so-called operation point or operating point) of the electric motor 9 according to the operating state. Parameters indicating the operating state of the electric motor 9 include, for example, the d-axis current $i_d$, the d-axis current target value $i_d*$, the d-axis final voltage command value $V_{d\_fin}*$, the q-axis current $i_q$, the q-axis current target value $i_q*$, and the q-axis final voltage command value $V_{q\_fin}*$. In addition, the DC voltage $V_{dc}$ of the battery 15, the rotation speed N, the electric angular velocity $\omega_e$, and the like are also parameters indicating the operating state of the electric motor 9. In the present embodiment, the control mode switching determination unit 13 determines the control mode of the electric motor 9 based on the d-axis final voltage command value $V_{d\_fin}*$, the q-axis final voltage command value $V_{q\_fin}*$, the d-axis current $i_d$, the rotation speed N, and the DC voltage $V_{dc}$. The control mode switching determination unit 13 outputs the control mode signal Sm, which is the determination result of the control mode, to the current vector control unit 1, the voltage phase control unit 2, and the output controller 3.

As described above, the electric motor system 100 is a system that drives the electric motor 9 by the pulse width modulation control. In addition, the electric motor system 100 appropriately switches the control mode of the electric motor 9 between the current vector control and the voltage phase control according to the operating state of the electric motor 9.

Hereinafter, specific configurations and the like of the units of the electric motor system 100 will be described in detail.

[Current Vector Control]

Figure 2:
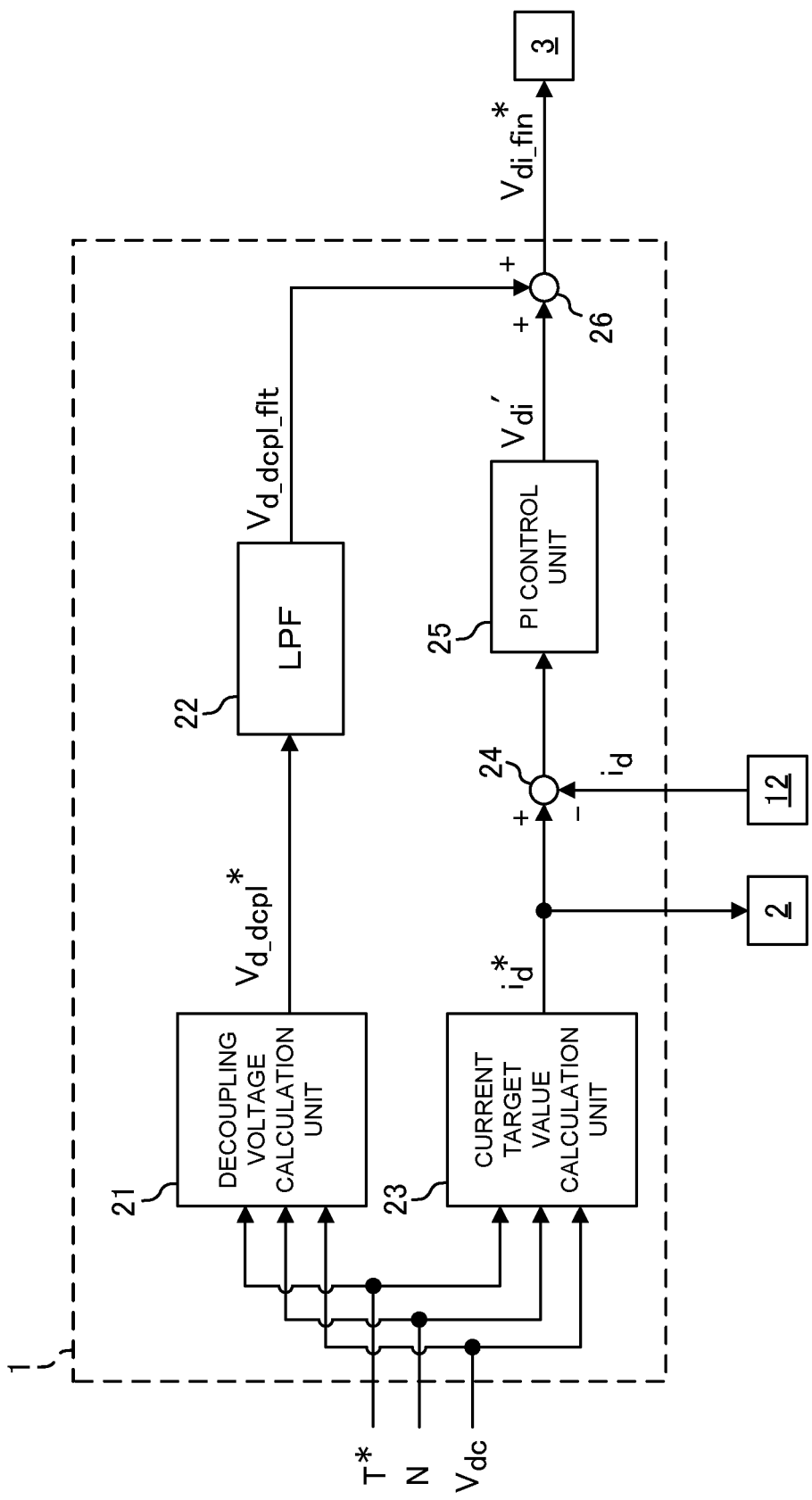
FIG. 2 is a block diagram illustrating a partial configuration of a current vector control unit for generating a d-axis voltage command value in current vector control.

FIG. 2 is a block diagram illustrating a partial configuration (d-axis voltage command value calculation unit) of the current vector control unit 1 for generating the d-axis voltage command value $V_{di\_fin}*$ in the current vector control. As illustrated in FIG. 2, the current vector control unit 1 includes a decoupling voltage calculation unit 21, a low-pass filter (LPF) 22, a current target value calculation unit 23, a subtractor 24, a PI control unit 25, and an addition unit 26.

The decoupling voltage calculation unit 21 calculates a decoupling voltage $V_{d\_dcpl}*$ based on the torque target value T*, the rotation speed N, and the DC voltage $V_{dc}$ of the battery 15. The decoupling voltage $V_{d\_dcpl}*$ is output to the LPF 22. The decoupling voltage $V_{d\_dcpl}*$ is a voltage value for canceling a voltage that interferes with each other between the d-axis and the q-axis (hereinafter referred to as an interference voltage).

The decoupling voltage calculation unit 21 stores, for example, a decoupling table (not illustrated). The decoupling table is a lookup table in which the decoupling voltage $V_{d\_dcpl}*$ is associated with each operating state of the electric motor 9 in advance. In the decoupling table, the operating state of the electric motor 9 is specified by, for example, the torque target value T*, the rotation speed N, and the DC voltage $V_{dc}$ of the battery 15. Accordingly, when the decoupling voltage calculation unit 21 has the decoupling table, the decoupling voltage calculation unit 21 acquires the torque target value T*, the rotation speed N, and the DC voltage $V_{dc}$ of the battery 15. Then, the decoupling voltage calculation unit 21 calculates (acquires) the decoupling voltage $V_{d\_dcpl}*$ according to the operating state of the electric motor 9 by referring to the decoupling table. The decoupling voltage $V_{d\_dcpl}*$ stored in the decoupling table is determined in advance according to the d-axis current target value $i_d*$ when the electric motor 9 generates a torque designated by the torque target value T* at maximum efficiency. In addition, the decoupling voltage $V_{d\_dcpl}*$ is determined in advance based on an experiment or the like.

The LPF 22 is a low-pass filter adopted in consideration that the interference voltage depends on an amount of current. A time constant of the LPF 22 is set so as to ensure responsiveness of a target d-axis current. A decoupling voltage $V_{d\_dcpl\_flt}$ processed by the LPF 22 is input to the addition unit 26.

The current target value calculation unit 23 calculates the d-axis current target value $i_d*$ based on the torque target value T*, the rotation speed N, and the DC voltage $V_{dc}$ of the battery 15. The d-axis current target value $i_d*$ is output to the subtractor 24. In addition, the d-axis current target value $i_d*$ is output to the voltage phase control unit 2.

The current target value calculation unit 23 stores, for example, a current table (not illustrated). The current table is a table in which the d-axis current target value $i_d*$ is associated with each operating state (operation point) of the electric motor 9 in advance. In the current table, the operating state of the electric motor 9 is specified by, for example, the torque target value T*, the rotation speed N, and the DC voltage $V_{dc}$ of the battery 15. Accordingly, when the current target value calculation unit 23 has the current table, the current target value calculation unit 23 acquires the torque target value T*, the rotation speed N, and the DC voltage $V_{dc}$ of the battery 15. Then, the current target value calculation unit 23 calculates (acquires) the d-axis current target value $i_d*$ according to the operating state of the electric motor 9 by referring to the current table. The d-axis current target value $i_d*$ stored in the current table is a value for the electric motor 9 to generate a torque designated by the torque target value T* or the like at the maximum efficiency, and is determined in advance by an experiment or the like.

The subtractor 24 calculates a d-axis current deviation. The d-axis current deviation is a deviation between a d-axis current target value and an actual detected value. In the present embodiment, the subtractor 24 calculates a d-axis current deviation ($i_d*-i_d$) by subtracting the d-axis current $i_d$, which is a detected value, from the d-axis current target value $i_d*$. The d-axis current deviation is input to the PI control unit 25.

The PI control unit 25 calculates a d-axis current feedback voltage command value $V_{di}'$ by proportional-integral (PI) control for feeding back the d-axis current deviation. In the present embodiment, the PI control unit 25 calculates the current feedback voltage command value $V_{di}'$ according to the following Equation (3). In the Equation (3), "$K_{dp}$" is a proportional gain for the d-axis. In addition, in the Equation (3), "$K_{di}$" is an integral gain for the d-axis. These PI control gains are determined in advance based on an experiment and the like. The d-axis current feedback voltage command value $V_{di}'$ is input to the addition unit 26.

[Equation 3]

$$V_{di}' = \frac{K_{dp}S - K_{di}}{S}(i_d^* - i_d) \quad (3)$$

The addition unit 26 calculates the d-axis voltage command value $V_{di\_fin}*$ in the current vector control by adding the decoupling voltage $V_{d\_dcpl\_flt}$ processed by the LPF 22 and the current feedback voltage command value $V_{dc}$ as represented by the following Equation (4).

[Equation 4]

$$V_{di\_fin}* = V_{d\_dcpl\_flt} + V_{di}' \quad (4)$$

As described above, the current vector control unit 1 calculates the d-axis voltage command value $V_{di\_fin}*$ in the current vector control by feeding back the d-axis current $i_d$. The current vector control is suitable for controlling the electric motor 9 in a situation where a voltage norm of electric power supplied to the electric motor 9 is not saturated and the voltage norm can be changed according to a request.

Here, among the specific configuration of the current vector control unit 1, the d-axis voltage command value calculation unit that generates the d-axis voltage command value $V_{di\_fin}*$ in the current vector control has been described. Alternatively, a portion unit generating the q-axis voltage command value $V_{qi\_fin}*$ in the current vector control is configured in the same manner as the above d-axis voltage command value calculation unit. That is, the current vector control unit 1 includes a q-axis voltage command value calculation unit as a configuration for generating the q-axis voltage command value $V_{qi\_fin}*$ in the current vector control. The q-axis voltage command value calculation unit includes a decoupling voltage calculation unit, an LPF, a current target value calculation unit, a subtractor, a PI control unit, and an addition unit. Then, units of the q-axis voltage command value calculation unit have the same configuration as that of the d-axis voltage command value calculation unit except that the units are for the q-axis.

[Voltage Phase Control]

Figure 3:
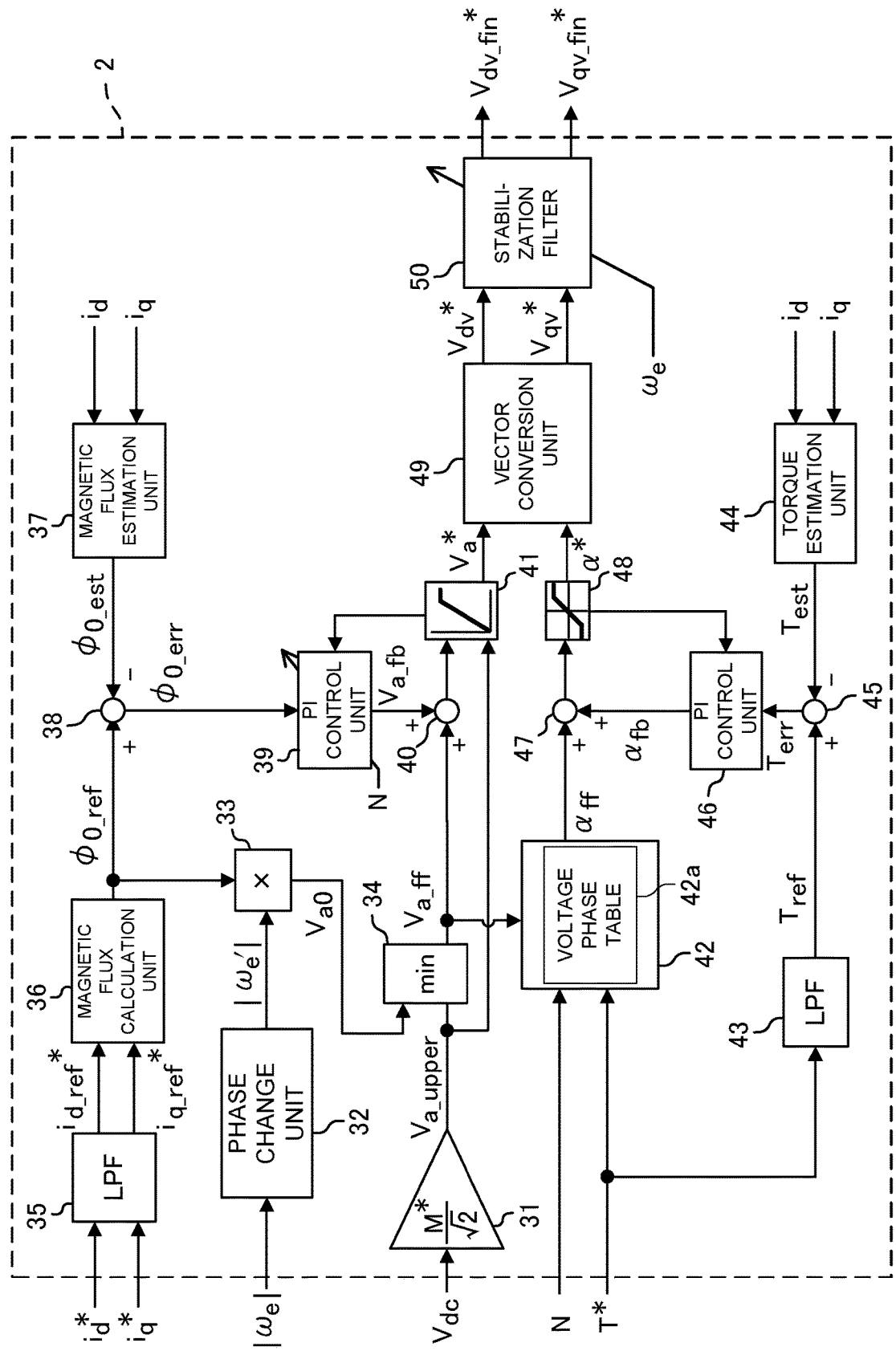
FIG. 3 is a block diagram illustrating a configuration of a voltage phase control unit.

FIG. 3 is a block diagram illustrating a configuration of the voltage phase control unit 2. The voltage phase control unit 2 includes (a) a voltage norm determination unit, (b) a voltage phase determination unit, and (c) a voltage command value calculation unit.

(a) The voltage norm determination unit is configured to determine the voltage norm of the electric power supplied to the electric motor 9 in the voltage phase control. Specifically, the voltage norm determination unit includes a voltage norm command value generation unit, a magnetic flux feedback control unit, a voltage norm synthesis unit 40, and a voltage norm limitation unit 41 illustrated in FIG. 3. Specifically, the voltage norm command value generation unit includes an upper voltage norm limit value calculation unit 31, a phase change unit 32, an induced voltage calculation unit 33, and a feedforward voltage norm command value calculation unit 34 illustrated in FIG. 3. Specifically, the magnetic flux feedback control unit includes a reference current calculation unit 35, a magnetic flux calculation unit 36, a magnetic flux estimation unit 37, a magnetic flux deviation calculation unit 38, and a PI control unit 39 illustrated in FIG. 3.

(b) The voltage phase determination unit is configured to determine a phase of a voltage applied to the electric motor 9 in the voltage phase control. Specifically, the voltage phase determination unit includes a voltage phase command value generation unit 42, a torque feedback control unit, a phase synthesis unit 47, and a phase limitation unit 48 illustrated in FIG. 3. Specifically, the torque feedback control unit includes a reference torque generation unit 43, a torque estimation unit 44, a torque deviation calculation unit 45, and a PI control unit 46 illustrated in FIG. 3.

(c) The voltage command value calculation unit calculates the d-axis voltage command value $V_{dv\_fin}*$ and the q-axis voltage command value $V_{qv\_fin}*$ in the voltage phase control. These are calculated based on the voltage norm determined by the voltage norm determination unit and the phase of the voltage determined by the voltage phase determination unit. Specifically, the voltage command value calculation unit includes a vector conversion unit 49 and a stabilization filter 50 illustrated in FIG. 3.

(a-1) Voltage Norm Command Value Generation Unit

The voltage norm command value generation unit generates a feedforward voltage norm command value (hereinafter referred to as an FF voltage norm command value $V_{a\_ff}$) by feedforward control. The FF voltage norm command value $V_{a\_ff}$ is a command value for determining a magnitude of the voltage applied to the electric motor 9 in the voltage phase control. In addition, the FF voltage norm command value $V_{a\_ff}$ is a basic target value of a voltage norm determined based on the operating state of the electric motor 9. In the present embodiment, the FF voltage norm command value $V_{a\_ff}$ generated by the voltage norm command value generation unit is a basic target value (so-called basic value) of a voltage norm in the voltage phase control. Therefore, a voltage norm actually applied to the electric motor 9 is limited by the voltage norm synthesis unit 40 and the voltage norm limitation unit 41.

The FF voltage norm command value $V_{a\_ff}$ corresponds to a command value that designates a modulation rate M of PWM control (hereinafter referred to as a modulation rate command value M*). Therefore, the FF voltage norm command value $V_{a\_ff}$ generated by the voltage norm command value generation unit corresponds to a basic target value of the modulation rate M (reference modulation rate). The modulation rate command value M* can be set freely. The modulation rate command value M* is calculated by using, for example, the DC voltage $V_{dc}$ of the battery 15 and a voltage norm command value $V_a*$ described later. For example, the modulation rate command value M* is calculated according to $M*=(\sqrt{2}/V_{dc})V_a*$. In the present embodiment, the modulation rate M of the PWM control is a ratio of an amplitude "Amp" of a fundamental wave component to the DC voltage $V_{dc}$ of the battery 15 ($|Amp/V_{dc}|$). The fundamental wave component is a fundamental frequency component among frequency components included in a waveform of the phase-to-phase voltage to be applied to the electric motor 9.

In a non-overmodulation state in which the modulation rate M is 1 or less (normal pulse width modulation state), a fundamental wave component of a correlation voltage is a pseudo-sine wave. A lower limit of the modulation rate M is 0.

On the other hand, in an overmodulation state in which the modulation rate M exceeds 1, the power element of the inverter 6 does not switch at a vicinity of a maximum value and a minimum value of the fundamental wave component. Therefore, in the overmodulation state, a waveform of the correlation voltage is a waveform in which the vicinity of the maximum value and the minimum value of the fundamental wave component is cut. In addition, in the overmodulation state, the waveform of the correlation voltage includes a harmonic component. Then, in the overmodulation state, when the modulation rate M is, for example, approximately 1.1 or more, the waveform of the correlation voltage is substantially a rectangular wave. That is, the overmodulation state extremely includes a rectangular wave state in which the waveform of the correlation voltage is substantially a rectangular wave.

As described above, the voltage norm command value generation unit includes the upper voltage norm limit value calculation unit 31, the phase change unit 32, the induced voltage calculation unit 33, and the feedforward voltage norm command value calculation unit 34.

The upper voltage norm limit value calculation unit 31 calculates an upper voltage norm limit value $V_{a\_upper}$ based on the DC voltage $V_{dc}$ of the battery 15 and the modulation rate command value M*. The upper voltage norm limit value $V_{a\_upper}$ is an upper limit value of the FF voltage norm command value $V_{a\_ff}$ and the voltage norm command value $V_a*$. The upper voltage norm limit value $V_{a\_upper}$ is calculated, for example, according to $V_{a\_upper}=(V_{dc}/\sqrt{2}) M*$. The upper voltage norm limit value $V_{a\_upper}$ is input to the feedforward voltage norm command value calculation unit 34.

The phase change unit 32 changes a phase of the electric angular velocity $\omega_e$. More specifically, the phase change unit 32 acquires, for a command value calculation model (configuration of the voltage phase control unit 2) determined in advance in order to calculate the d-axis voltage command value $V_{dv\_fin}*$ and the q-axis voltage command value $V_{qv\_fin}*$, a predetermined required time $T_s$ including a time required from detection of the electric angular velocity $\omega_e$ to calculation of these command values. The required time $T_s$ is generally minimized at a time point when the command value calculation model is designed. Then, the phase of the electric angular velocity $\omega_e$ is changed based on the required time $T_s$. More specifically, the phase change unit 32 calculates an absolute value $|\omega_e'|$ of the electric angular velocity after the phase change (hereinafter, simply referred to as an "electric angular velocity after phase change" for simplicity) by advancing a phase of an absolute value $|\omega_e|$ of the electric angular velocity $\omega_e$. A configuration of the phase change unit 32 and a phase change method will be described in detail later. The electric angular velocity $|\omega_e'|$ after the phase change is input to the induced voltage calculation unit 33.

The induced voltage calculation unit 33 calculates a reference induced voltage $V_{a0}$ by using a reference magnetic flux norm $\varphi_{0\_ref}$ described later and the electric angular velocity $\omega_e'$ after the phase change. In the present embodiment, the induced voltage calculation unit 33 calculates the reference induced voltage $V_{a0}$ by multiplying the reference magnetic flux norm $\varphi_{0\_ref}$ by the electric angular velocity $\omega_e'$ after the phase change. The calculated reference induced voltage $V_{a0}$ is input to the feedforward voltage norm command value calculation unit 34.

The feedforward voltage norm command value calculation unit 34 calculates the FF voltage norm command value $V_{a\_ff}$ by using the upper voltage norm limit value $V_{a\_upper}$ and the reference induced voltage $V_{a0}$. Specifically, the feedforward voltage norm command value calculation unit 34 is configured by a minimum function (min) using the upper voltage norm limit value $V_{a\_upper}$ and the reference induced voltage $V_{a0}$ as arguments, and outputs a smaller value in the upper voltage norm limit value $V_{a\_upper}$ and the reference induced voltage $V_{a0}$ as the FF voltage norm command value $V_{a\_ff}$. Therefore, in principle, the reference induced voltage $V_{a0}$ is the FF voltage norm command value $V_{a\_ff}$, but when the reference induced voltage $V_{a0}$ exceeds the upper voltage norm limit value $V_{a\_upper}$, the upper voltage norm limit value $V_{a\_upper}$ is the FF voltage norm command value $V_{a\_ff}$. The FF voltage norm command value $V_{a\_ff}$ calculated in this way is input to the voltage norm synthesis unit 40 and the voltage norm limitation unit 41.

(a-2) Magnetic Flux Feedback Control Unit

As described above, the magnetic flux feedback control unit includes the reference current calculation unit 35, the magnetic flux calculation unit 36, the magnetic flux estimation unit 37, the magnetic flux deviation calculation unit 38, and the PI control unit 39. In addition, the magnetic flux feedback control unit calculates a magnetic flux state quantity representing a magnetic flux generated in the electric motor 9 based on the current supplied to the electric motor 9 as a whole. The magnetic flux generated in the electric motor 9 is a synthetic magnetic flux obtained by synthesizing a magnetic flux (hereinafter referred to as a magnetic flux of magnet) $\Phi_a$ of a permanent magnet provided in the electric motor 9 and a magnetic flux (hereinafter referred to as a winding magnetic flux) generated by a current supplied to a winding (coil) of the electric motor 9. The magnetic flux state quantity is, for example, a reference magnetic flux norm $\varphi_{0\_ref}$ representing a target response of a norm of a vector representing the synthetic magnetic flux (hereinafter referred to as a magnetic flux norm), an estimated magnetic flux norm value $\varphi_{0\_est}$ representing an estimated value of the magnetic flux norm, and a magnetic flux deviation $\varphi_{0\_err}$ representing these deviations. In addition, the magnetic flux feedback control unit calculates a feedback norm command value (FB voltage norm command value $V_{a\_fb}$) to feed back to the FF voltage norm command value $V_{a\_ff}$ according to the magnetic flux state quantity.

The reference current calculation unit 35 calculates a d-axis reference current $i_{d\_ref}^*$ representing a target response of the d-axis current by using the d-axis current target value $i_d^*$. In addition, the reference current calculation unit 35 calculates a q-axis reference current $i_{q\_ref}^*$ representing a target response of a q-axis current by using the q-axis current target value $i_q^*$. The d-axis reference current $i_{d\_ref}^*$ and the q-axis reference current $i_{q\_ref}^*$ are input to the magnetic flux calculation unit 36. The reference current calculation unit 35 is, for example, a low-pass filter (LPF) having the same time constant as that of the LPF 22 (see FIG. 2).

The magnetic flux calculation unit 36 calculates the reference magnetic flux norm $\varphi_{0\_ref}$ based on the d-axis reference current $i_{d\_ref}^*$ and the q-axis reference current $i_{q\_ref}^*$. The reference magnetic flux norm $\varphi_{0\_ref}$ represents a target value of the magnetic flux norm in the voltage phase control. The magnetic flux calculation unit 36 calculates the reference magnetic flux norm $\varphi_{0\_ref}$ by using a d-axis inductance $L_d$, a q-axis inductance $L_q$, and the magnetic flux $\Phi_a$ of magnet according to the following Equation (5). The reference magnetic flux norm $\varphi_{0\_ref}$ is input to the magnetic flux deviation calculation unit 38.

[Equation 5]

$$\varphi_{0\_ref} = \sqrt{(\Phi_a + L_d i_{d\_ref}^*)^2 + (L_q i_{q\_ref}^*)^2} \quad (5)$$

The magnetic flux $\Phi_a$ of magnet, the d-axis inductance $L_d$, and the q-axis inductance $L_q$ are constants. The d-axis reference current $i_{d\_ref}^*$ and the q-axis reference current $i_{q\_ref}^*$ are variables. However, the respective constants, i.e., the magnetic flux $\Phi_a$ of magnet, the d-axis inductance $L_d$, and the q-axis inductance $L_q$ may change depending on a magnet temperature, the d-axis current $i_d$, the q-axis current $i_q$, the d-axis current target value $i_d^*$, and/or the q-axis current target value $i_q^*$ of the electric motor 9. Therefore, the magnetic flux calculation unit 36 can appropriately change some or all of the respective constants depending on the magnet temperature or the like. In this case, the magnetic flux calculation unit 36 uses an appropriate constant corresponding to the magnet temperature or the like with reference to a map in which the above respective constants are determined according to the magnet temperature or the like. This map is determined in advance by an experiment, a simulation, or the like.

The magnetic flux estimation unit 37 calculates the estimated magnetic flux norm value $\varphi_{0\_est}$ based on the d-axis current $i_d$ and the q-axis current $i_q$, which are detected values. The estimated magnetic flux norm value $\varphi_{0\_est}$ is an estimated value of an actual magnetic flux norm in the electric motor 9. A method of calculating the estimated magnetic flux norm value $\varphi_{0\_est}$ is the same as a method of calculating the reference magnetic flux norm $\varphi_{0\_ref}$ except that the d-axis current $i_d$ and the q-axis current $i_q$ are used as variables. That is, the magnetic flux estimation unit 37 calculates the estimated magnetic flux norm value $\varphi_{0\_est}$ according to the following Equation (6). The estimated magnetic flux norm value $\varphi_{0\_est}$ is input to the magnetic flux deviation calculation unit 38.

[Equation 6]

$$\varphi_{0\_est} = \sqrt{(\Phi_a + L_d i_d)^2 + (L_q i_q)^2} \quad (6)$$

The magnetic flux deviation calculation unit 38 calculates the magnetic flux deviation $\varphi_{0\_err}$. In the present embodiment, the magnetic flux deviation calculation unit 38 calculates the magnetic flux deviation $\varphi_{0\_err}$ by subtracting the estimated magnetic flux norm value $\varphi_{0\_est}$ from the reference magnetic flux norm $\varphi_{0\_ref}$. The magnetic flux deviation $\varphi_{0\_err}$ is input to the PI control unit 39.

The PI control unit 39 calculates the feedback voltage norm command value (hereinafter referred to as a FB voltage norm command value) $V_{a\_fb}$ by PI control. The FB voltage norm command value $V_{a\_fb}$ is a voltage norm command value for feeding back to the FF voltage norm command value $V_{a\_ff}$. Specifically, the PI control unit 39 calculates the FB voltage norm command value $V_{a\_fb}$ by using the electric angular velocity $\omega_e$ and the magnetic flux deviation $\varphi_{0\_err}$ according to the following Equation (7). In the Equation (7), "$K\varphi_p$" is a proportional gain. "$K\varphi_i$" is an integral gain. These gains are determined in advance by an experiment, a simulation, or the like. In addition, the electric angular velocity $\omega_e$ fluctuates as a variable gain that varies according to the rotation speed N. The FB voltage norm command value $V_{a\_fb}$ is input to the voltage norm synthesis unit 40.

[Equation 7]

$$V_{a\_fb} = \omega_e K_{\phi p}\left(1 + \frac{K_{\phi i}}{s}\right)\phi_{0\_err} \quad (7)$$

(a-3) Voltage Norm Synthesis Unit

The voltage norm synthesis unit 40 generates the voltage norm command value $V_a^*$ by feeding back the FB voltage norm command value $V_{a\_fb}$ to the FF voltage norm command value $V_{a\_ff}$. The voltage norm command value $V_a^*$ is a continuous value. In the present embodiment, the voltage norm synthesis unit 40 calculates the voltage norm command value $V_a^*$ by adding the FB voltage norm command value $V_{a\_fb}$ to the FF voltage norm command value $V_{a\_ff}$. The voltage norm command value $V_a^*$ is a target value of a voltage norm corrected based on the magnetic flux state quantity (or a current amount that is a calculation source of the magnetic flux state quantity). Accordingly, the voltage norm command value (voltage norm command value $V_a^*$) in the voltage phase control can be adjusted by the feedback of the FB voltage norm command value $V_{a\_fb}$. As a result, the voltage norm command value (voltage norm command value $V_a^*$) in the voltage phase control is controlled such that the magnetic flux deviation $\varphi_{0\_err}$ approaches zero.

As described above, the magnetic flux deviation $\varphi_{0\_err}$ is a value obtained by subtracting the estimated magnetic flux norm value $\varphi_{0\_est}$ from the reference magnetic flux norm $\varphi_{0\_ref}$. Therefore, for example, when the rotation speed N suddenly decreases due to a high load such as a sudden braking from a state in which the rotation speed N is high (a state in which the electric motor 9 is rotating at a medium speed to a high speed), the estimated magnetic flux norm value $\varphi_{0\_est}$ steeply increases with respect to the reference magnetic flux norm $\varphi_{0\_ref}$. Then, the magnetic flux deviation $\varphi_{0\_err}$ becomes a negative value, and the FB voltage norm command value $V_{a\_fb}$, also becomes a negative value. In this case, the voltage norm command value $V_a^*$ is a value smaller than the FF voltage norm command value $V_{a\_ff}$ which is an initial target value. As a result, the voltage norm command value $V_a^*$ becomes a value close to the voltage norm of the electric power applied to the electric motor 9 in the current vector control. When the current vector control is performed, the same applies to a case where the voltage norm of the electric power applied to the electric motor 9 suddenly increases due to a sudden acceleration or the like, and the voltage norm command value $V_a^*$ becomes the value close to the voltage norm of the electric power applied to the electric motor 9 in the current vector control. That is, the above feedback control based on the magnetic flux state quantity has an action of reducing a gap between the voltage norms in the voltage phase control and the current vector control. Therefore, switching between the voltage phase control and the current vector control is performed substantially seamlessly by the above feedback control based on the magnetic flux state quantity.

(a-4) Voltage Norm Limitation Unit

The voltage norm limitation unit 41 limits the voltage norm command value $V_a^*$ to a value between a predetermined lower limit value and the upper voltage norm limit value $V_{a\_upper}$ (voltage norm limitation processing). The lower limit value is, for example, zero. When the voltage norm command value $V_a^*$ is limited to the lower limit value or an upper limit value $V_{a\_max}$, the voltage norm limitation unit 41 outputs a notification signal indicating the above to the PI control unit 39. When receiving the notification signal, the PI control unit 39 initializes an integrating unit included therein for anti-windup.

(b-1) Voltage Phase Command Value Generation Unit

The voltage phase command value generation unit 42 generates a feed forward voltage phase command value (hereinafter referred to as a FF voltage phase command value) $\alpha_{ff}$ according to the operating state of the electric motor 9 by feed forward control. The FF voltage phase command value $\alpha_{ff}$ represents a phase of a voltage to be supplied to the electric motor 9. In addition, the FF voltage phase command value $\alpha_{ff}$ is a basic target value of a voltage phase determined according to the operating state of the electric motor 9. The voltage phase command value generation unit 42 includes a voltage phase table 42a that is a lookup table for generating the FF voltage phase command value $\alpha_{ff}$. The voltage phase table 42a is a lookup table in which the FF voltage phase command value $\alpha_{ff}$ is stored in association with each operating state (operation point) of the electric motor 9. The FF voltage phase command value $\alpha_{ff}$ stored in the voltage phase table 42a is, for example, a value of a voltage phase measured in a nominal state for each operating state of the electric motor 9 in an experiment or the like. In the present embodiment, the FF voltage norm command value $V_{a\_ff}$, the rotation speed N, the torque target value T*, and the FF voltage phase command value $\alpha_{ff}$ are stored in association with each other in the voltage phase table 42a. Therefore, when acquiring these parameters, the voltage phase command value generation unit 42 generates the FF voltage phase command value $\alpha_{ff}$ corresponding to a combination of these parameters by referring to the voltage phase table 42a. The generated FF voltage phase command value $\alpha_{ff}$ is input to the phase synthesis unit 47.

(b-2) Torque Feedback Control Unit

As described above, the torque feedback control unit includes the reference torque generation unit 43, the torque estimation unit 44, the torque deviation calculation unit 45, and the PI control unit 46. The torque feedback control unit calculates a feedback voltage phase command value (hereinafter referred to as a FB voltage phase command value) $\alpha_{fb}$ as a whole. The FB voltage phase command value $\alpha_{fb}$ is a voltage phase command value for feeding back to the FF voltage phase command value $\alpha_{ff}$.

The reference torque generation unit 43 generates a reference torque $T_{ref}$ representing a target response of the torque in the electric motor 9 by using the torque target value T*. The reference torque generation unit 43 is, for example, a low-pass filter having the same time constant as that of the LPF 22 (see FIG. 2). The generated reference torque $T_{ref}$ is input to the torque deviation calculation unit 45.

The torque estimation unit 44 calculates an estimated torque value $T_{est}$. The estimated torque value $T_{est}$ is an estimated value of a torque of the electric motor 9 in a specific operating state. The torque estimation unit 44 includes a torque table (not illustrated) for estimating the estimated torque value $T_{est}$. The torque table is a lookup table in which the estimated torque value $T_{est}$ is stored in association with each operating state (operation point) of the electric motor 9. In the present embodiment, the d-axis current $i_d$, the q-axis current $i_q$, and the estimated torque value $T_{est}$ are stored in association with each other in the torque table. Therefore, when acquiring these parameters, the torque estimation unit 44 refers to the torque table and calculates the estimated torque value $T_{est}$ corresponding to a combination of these parameters. The estimated torque value $T_{est}$ is input to the torque deviation calculation unit 45.

The torque deviation calculation unit 45 calculates a torque deviation $T_{err}$. The torque deviation $T_{err}$ is a deviation between the reference torque $T_{ref}$ and the estimated torque value $T_{est}$. In the present embodiment, the torque deviation calculation unit 45 calculates the torque deviation $T_{err}$ by subtracting the estimated torque value $T_{est}$ from the reference torque $T_{ref}$. The torque deviation $T_{err}$ is input to the PI control unit 46.

The PI control unit 46 calculates the FB voltage phase command value $\alpha_{fb}$ by using the torque deviation $T_{err}$ ($=T_{ref}-T_{est}$). Specifically, the PI control unit 46 calculates the FB voltage phase command value $\alpha_{fb}$ according to the following Equation (8). In the Equation (8), "$K\alpha_p$" is a proportional gain. In addition, "$K\alpha_i$" is an integral gain. These gains are determined in advance by an experiment, a simulation, or the like. The FB voltage phase command value $\alpha_{fb}$ is input to the phase synthesis unit 47.

[Equation 8]

$$\alpha_{fb} = \frac{K_{\alpha p}s + K_{\alpha i}}{s}(T_{ref} - T_{est}) \qquad (8)$$

(b-3) Phase Synthesis Unit

The phase synthesis unit 47 generates a voltage phase command value $\alpha^*$ by feeding back the FB voltage phase command value $\alpha_{fb}$ to the FF voltage phase command value $\alpha_{ff}$. In the present embodiment, the phase synthesis unit 47 generates the voltage phase command value $\alpha^*$ by adding the FB voltage phase command value $\alpha_{fb}$ to the FF voltage phase command value $\alpha_{ff}$. The voltage phase command value $\alpha^*$ is a target value of a voltage phase corrected based on the torque deviation $T_{err}$ (or a current amount used to calculate the torque deviation $T_{err}$). The correction converges the torque deviation $T_{err}$ to zero. Accordingly, the voltage phase command value $\alpha^*$ generated by the phase synthesis unit 47 is input to the phase limitation unit 48.

(b-4) Phase Limitation Unit

The phase limitation unit 48 limits the voltage phase command value $\alpha^*$ to a predetermined voltage phase range (voltage phase limitation processing). The predetermined voltage phase range is a range from a predetermined lower limit value of the voltage phase (hereinafter referred to as a lower voltage phase limit value) $\alpha_{min}$ to a predetermined upper limit value of the voltage phase (hereinafter referred to as an upper voltage phase limit value) $\alpha_{max}$. Setting of the lower voltage phase limit value $\alpha_{min}$ and the upper voltage phase limit value $\alpha_{max}$ will be described later in detail. When the voltage phase command value $\alpha^*$ is limited by the voltage phase limitation processing, the phase limitation unit 48 outputs a notification signal indicating the above to the PI control unit 46. When receiving the notification signal, the PI control unit 46 initializes an integrating unit included therein for anti-windup.

(c-1) Vector Conversion Unit

The vector conversion unit 49 converts the voltage norm command value $V_a^*$ and the voltage phase command value $\alpha^*$ into a d-axis voltage command value $V_{dv}^*$ and a q-axis voltage command value $V_{qv}^*$ according to the following Equation (9).

[Equation 9]

$$\begin{cases} V_{dv}^* = -V_a^* \sin\alpha^* \\ V_{qv}^* = V_a^* \cos\alpha^* \end{cases} \qquad (9)$$

The stabilization filter 50 calculates the d-axis voltage command value $V_{dv\_fin}^*$ and the q-axis voltage command value $V_{qv\_fin}^*$, which are voltage command values in the voltage phase control, by using the above d-axis voltage command value $V_{dv}^*$ and q-axis voltage command value $V_{qv}^*$. Specifically, the stabilization filter 50 calculates the d-axis voltage command value $V_{dv\_fin}^*$ and the q-axis voltage command value $V_{qv\_fin}^*$ according to an Equation (10). The stabilization filter 50 cancels resonance characteristics of the d-axis current $i_d$ and the q-axis current $i_q$ with respect to the d-axis voltage command value $V_{dv}^*$ and the q-axis voltage command value $V_{qv}^*$ after the vector conversion. Accordingly, the stabilization filter 50 stabilizes a feedback loop.

[Equation 10]

$$\begin{pmatrix} V_{dv\_fin}^* \\ V_{qv\_fin}^* \end{pmatrix} = \begin{pmatrix} \frac{k_{11}s+1}{\tau_m s+1} & \frac{k_{12}s}{\tau_m s+1} \\ -\frac{k_{21}s}{\tau_m s+1} & \frac{k_{22}s+1}{\tau_m s+1} \end{pmatrix} \begin{pmatrix} V_{dv}^* \\ V_{qv}^* \end{pmatrix} \qquad (10)$$

In the Equation (10), "$k_{11}$", "$k_{12}$", "$k_{21}$", and "$k_{22}$" are variable gains that change depending on the electric angular velocity $\omega_e$. These variable gains ($k_{11}$, $k_{12}$, $k_{21}$, $k_{22}$) are determined according to the following Equation (11). In the Equation (11), "$L_d'$" is a dynamic inductance of the d-axis. "$L_q'$" is a dynamic inductance of the q-axis.

[Equation 11]

$$\begin{pmatrix} k_{11} & k_{12} \\ k_{21} & k_{22} \end{pmatrix} = \frac{1}{R^2 + \omega_e^2 L_d L_q} \begin{pmatrix} R L_d' & \omega_e L_d' L_q \\ \omega_e L_d L_q' & R L_q' \end{pmatrix} \qquad (11)$$

As can be seen from the Equation (10), the stabilization filter 50 is designed such that the d-axis current $i_d$ and the q-axis current $i_q$ transiently exhibit a first-order delay response of a predetermined time constant $\tau_m$. The phase of the voltage applied to the electric motor 9 is advanced by the inductances of the d-axis and the q-axis, but the phase advance is small enough to be ignored when viewed as a whole system. Therefore, when the phase advance due to the inductances of the d-axis and the q-axis is ignored, transient dynamics of the d-axis voltage command value $V_{dv\_fin}^*$ and the q-axis voltage command value $V_{qv\_fin}^*$ in the voltage phase control can be regarded as the first-order delay response of the time constant $\tau_m$.

As described above, the voltage phase control unit 2 changes the voltage phase command value $\alpha^*$ such that the torque deviation $T_{err}$ converges to zero. Therefore, in the voltage phase control, even in a situation where the voltage norm of the electric power supplied to the electric motor 9 is saturated, the torque of the electric motor 9 can be changed according to the request. In particular, even in the overmodulation state or the extreme rectangular wave state, the torque of the electric motor 9 can be appropriately controlled by the voltage phase control. In addition, in the above voltage phase control, since the voltage norm command value $V_a^*$ is changed by feeding back the magnetic flux deviation $\varphi_{0\_err}$, switching between the voltage phase control and the current vector control is seamless.

As described above, the voltage phase control unit 2 calculates a final command value of the voltage applied to the electric motor 9 (d-axis voltage command value $V_{dv\_fin}^*$ and q-axis voltage command value $V_{qv\_fin}^*$) by the voltage phase control according to a "command value calculation model" (so-called transfer function) determined in advance for calculation by using a rotation parameter (electric angular velocity $\omega_e$) related to the rotation speed N of the electric motor 9. The voltage phase control unit 2 acquires the required time $T_s$ required for calculating the final command value (d-axis voltage command value $V_{dv\_fin}^*$ and q-axis voltage command value $V_{qv\_fin}^*$) in the voltage phase control according to the command value calculation model. Then, the detected rotation speed parameter (electric angular velocity $\omega_e$) is changed based on the required time $T_s$, and the final command value (d-axis voltage command value $V_{dv\_fin}^*$ and q-axis voltage command value $V_{qv\_fin}^*$) is calculated by using the changed rotation speed parameter (electric angular velocity $|\omega_e'|$) according to the command value calculation model.

The required time $T_s$ corresponding to the "command value calculation model" includes, for example, a time required from the detection of the rotation speed parameter (electric angular velocity $\omega_e$) to the calculation of the final command value (d-axis voltage command value $V_{dv\_fin}^*$ and q-axis voltage command value $V_{qv\_fin}^*$). In addition, the required time $T_s$ is determined at a time point when the command value calculation model is set (a time point when the voltage phase control unit 2 is designed). The command value calculation model is usually set such that the required time $T_s$ is as small as possible. However, the required time $T_s$ does not become zero no matter what system the command value calculation model is implemented specifically, since there are delay times due to various types of detection, calculation, and the like included therein. In addition, the required time $T_s$ can include not only the delay time generated by the calculation or the like of the voltage phase control unit 2, but also a delay time required for acquiring a parameter necessary for the voltage phase control (for example, the rotation speed parameter). For example, a time lag (detection period) in the detection of the rotation speed N can be included in the required time $T_s$. In addition, when there is a delay time until the voltage is actually applied from the inverter 6 to the electric motor 9 based on the final command value (d-axis voltage command value $V_{dv\_fin}^*$ and q-axis voltage command value $V_{qv\_fin}^*$), the delay time can also be included in the required time $T_s$. That is, the required time $T_s$ represents a part or the whole of a delay time of a response included in a period from the detection of the rotation speed parameter related to the rotation speed N to the application of the voltage to the electric motor 9. In the present embodiment, the required time $T_s$ is known by setting the command value calculation model as described above. Therefore, information related to the required time $T_s$ is held in advance in a memory (not illustrated), for example.

[Setting of Upper Voltage Phase Limit Value and Lower Voltage Phase Limit Value]

Figure 4:
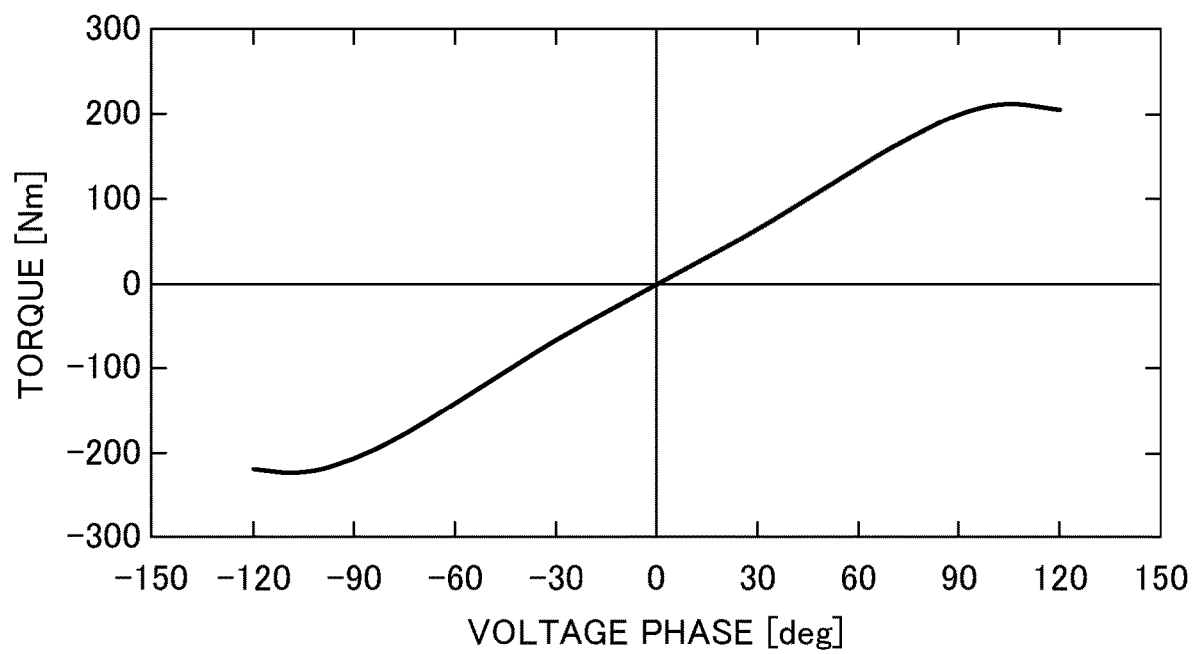
FIG. 4 is a graph illustrating setting of a voltage phase range in voltage phase control.

FIG. 4 is a graph illustrating setting of the voltage phase range in the voltage phase control. As illustrated in FIG. 4, in a certain electric motor, a correlation between a voltage phase $\alpha$ and a torque T is maintained generally within a range of the voltage phase $\alpha$ of −105 degrees to +105 degrees. In this case, the upper voltage phase limit value $\alpha_{max}$ is set to +105 degrees, and the lower voltage phase limit value $\alpha_{min}$ is set to −105 degrees. Therefore, when an electric motor having characteristics in FIG. 4 is used as the electric motor 9 of the electric motor system 100, the phase limitation unit 48 limits the voltage phase command value $\alpha^*$ in the range of −105 degrees to +105 degrees. This is to ensure controllability for the electric motor 9 by maintaining the correlation with the torque of the electric motor 9.

[Configuration and Phase Change Method of Phase Change Unit]

Figure 5:
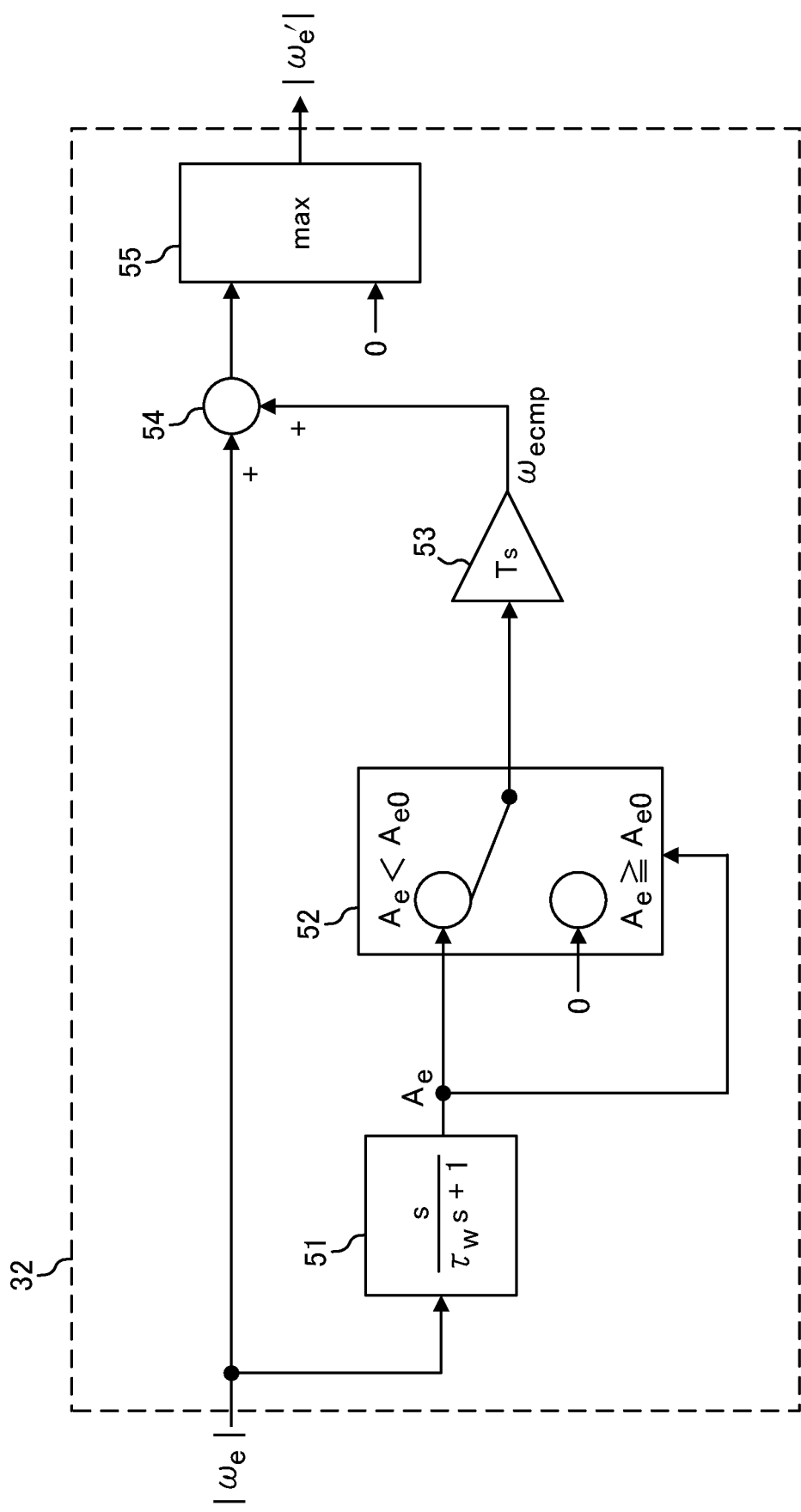
FIG. 5 is a block diagram illustrating a configuration of a phase change unit.

FIG. 5 is a block diagram illustrating a configuration of the phase change unit 32. As illustrated in FIG. 5, the phase change unit 32 includes an acceleration calculation unit 51, a change limitation unit 52, a phase change amount calculation unit 53, an addition unit 54, and a final limitation unit 55.

The acceleration calculation unit 51 differentiates the absolute value $|\omega_e|$ of the electric angular velocity $\omega_e$ with respect to time, and calculates an electric angular acceleration $A_e$. In the present embodiment, the acceleration calculation unit 51 is a so-called incomplete differentiator, and is a combination of a differentiator "s" and a low-pass filter "$1/(\tau_w s+1)$". Therefore, the acceleration calculation unit 51 approximately time-differentiates the absolute value $|\omega_e|$ of the electric angular velocity $\omega_e$. The time constant "$\tau_w$" is a constant determined in advance in consideration of resistance to high-frequency noise included in a detected value of the rotation speed N and responsiveness to a change of the rotation speed N. The electric angular acceleration $A_e$ is input to the change limitation unit 52.

The change limitation unit 52 is a switch that switches whether to change the phase of the electric angular velocity $\omega_e$ based on the electric angular acceleration $A_e$. In the present embodiment, the change limitation unit 52 determines whether to change the phase of the electric angular velocity $\omega_e$ by comparing the electric angular acceleration $A_e$ with a predetermined threshold $A_{e0}$ determined in advance. Specifically, when the electric angular acceleration $A_e$ is smaller than the threshold $A_{e0}$, the change limitation unit 52 determines to execute the change of the phase of the electric angular velocity $\omega_e$ (hereinafter, simply referred to as a phase change). On the other hand, when the electric angular acceleration $A_e$ is equal to or larger than the threshold $A_{e0}$, the change limitation unit 52 determines not to execute the phase change of the electric angular velocity $\omega_e$. The threshold $A_{e0}$ is determined in advance based on an experiment, a simulation, or the like. In addition, the threshold $A_{e0}$ is freely determined in order to correspond to a specific scene.

When it is determined that the electric angular acceleration $A_e$ is smaller than the threshold $A_{e0}$, the change limitation unit 52 outputs the input electric angular acceleration $A_e$. On the other hand, when it is determined that the electric angular acceleration $A_e$ is equal to or larger than the threshold $A_{e0}$, the change limitation unit 52 outputs an initial value determined in advance (zero in the present embodiment). The output by the change limitation unit 52 is input to the phase change amount calculation unit 53.

The phase change amount calculation unit 53 calculates a change amount of the phase of the electric angular velocity $\omega_e$ (hereinafter referred to as a phase change amount) $\omega_{ecmp}$ by using the output of the change limitation unit 52. In addition, when calculating the phase change amount $\omega_{ecmp}$, the phase change amount calculation unit 53 acquires the required time $T_s$ required until the final command value (d-axis voltage command value $V_{dv\_fin}^*$ and q-axis voltage command value $V_{qv\_fin}^*$) is calculated according to the command value calculation model in the voltage phase control. Then, the phase change amount calculation unit 53 calculates the phase change amount $\omega_{ecmp}$ in consideration of the required time $T_s$. The calculated phase change amount $\omega_{ecmp}$ is input to the addition unit 54.

In the present embodiment, the phase change amount calculation unit 53 calculates the phase change amount $\omega_{ecmp}$ by multiplying the output of the change limitation unit 52 by the required time $T_s$. Therefore, when the electric angular acceleration $A_e$ is smaller than the threshold $A_{e0}$, the phase change amount $\omega_{ecmp}$ is a product ($A_e T_s$) of the electric angular acceleration $A_e$ and the required time $T_s$. Accordingly, the phase change amount calculation unit 53 calculates the phase change amount $\omega_{ecmp}$ corresponding to the electric angular velocity $\omega_e$ that changes during the required time $T_s$. However, when the electric angular acceleration $A_e$ is equal to or larger than the threshold $A_{e0}$, since the output of the change limitation unit 52 is zero, the phase change amount $\omega_{ecmp}$ is also zero. This is a scene in which the phase of the electric angular velocity $\omega_e$ is not changed.

In the present embodiment, as described above, the rotation speed calculator 11 calculates the electric angular velocity $\omega_e$ by calculating the change amount of the electric angle $\theta$ in the unit time $\Delta t_{Nave}$. Therefore, in a certain electric angular acceleration $A_e$, a wasted time required for detecting the rotation speed N can be regarded as approximately $\Delta t_{Nave}/2$. In addition, as described above, in the stabilization filter 50, responses of the d-axis voltage command value $V_{dv\_fin}*$ and the q-axis voltage command value $V_{qv\_fin}*$ with respect to the d-axis voltage command value $V_{dv}*$ and the q-axis voltage command value $V_{qv}*$ can be regarded as a first-order response delay of the time constant $\tau_m$. Therefore, in a certain electric angular acceleration $A_e$, a wasted time in the output of the voltage to the electric motor 9 can be regarded as the time constant $\tau_m$. Therefore, in the present embodiment, the required time $T_s$ is expressed by the sum of the above. That is, the required time $T_s$ is calculated according to the following Equation (12).

[Equation 12]
$$T_S = \frac{\Delta t_{Nave}}{2} + \tau_m \tag{12}$$

By setting the required time $T_s$ in this way, the phase of the electric angular velocity $\omega_e$ is changed within a range that does not exceed a change amount that can be generated in the electric angular velocity $\omega_e$ per required time $T_s$ within a time range in which the electric angular acceleration $A_e$ can be regarded as substantially constant. As a result, even when the voltage norm is operated by using the electric angular velocity $|\omega_e'|$ after the phase change, an excessive change exceeding the required time $T_s$ is prevented.

The addition unit 54 adds the phase change amount $\omega_{ecmp}$ to the electric angular velocity $\omega_e$. Therefore, the phase of the electric angular velocity $\omega_e$ is advanced. An output of the addition unit 54 is the electric angular velocity $|\omega_e'|$ after the phase change. The electric angular velocity $|\omega_e'|$ after the phase change is output via the final limitation unit 55.

The final limitation unit 55 is configured by a maximum function (max) using the electric angular velocity $|\omega_e'|$ after the phase change, which is the output of the addition unit 54, and a fixed value "zero (0)" as arguments. Therefore, the final limitation unit 55 limits the lower limit value such that the electric angular velocity $|\omega_e'|$ after the phase change is not a negative value.

As described above, the phase change unit 32 acquires the required time $T_s$ required until the final command value (d-axis voltage command value $V_{dv\_fin}*$ and q-axis voltage command value $V_{qv\_fin}*$) is calculated according to the command value calculation in the voltage phase control. Then, the phase change unit 32 changes the phase of the electric angular velocity $\omega_e$ based on the required time $T_s$. Thereafter, the calculation of the final command value according to the command value calculation model in the voltage phase control is executed based on the electric angular velocity $|\omega_e'|$ whose phase is changed. In the phase change processing, the phase of the electric angular velocity $\omega_e$ is changed in advance such that the electric angular velocity $|\omega_e'|$ after the phase change approaches the electric angular velocity $\omega_e$ after the required time $T_s$ is elapsed.

[Specific Configuration of Output Controller and Generation of Control Mode Signal]

Figure 6:
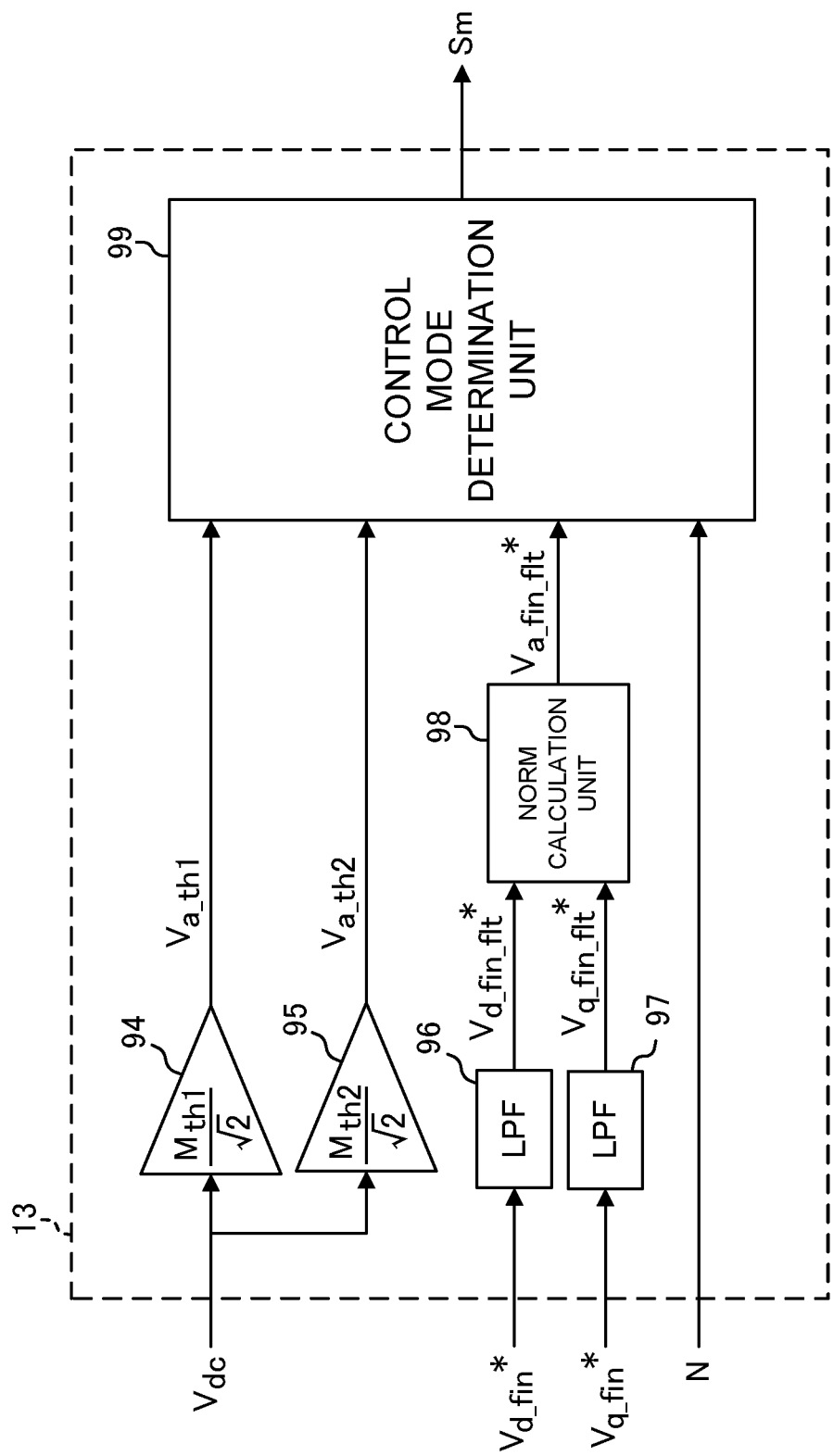
FIG. 6 is a block diagram illustrating a configuration of a switching determination unit.

FIG. 6 is a block diagram illustrating a configuration of the control mode switching determination unit 13. As illustrated in FIG. 6, the control mode switching determination unit 13 includes a first norm threshold calculation unit 94, a second norm threshold calculation unit 95, an averaging filter 96, an averaging filter 97, a norm calculation unit 98, and a control mode determination unit 99.

The first norm threshold calculation unit 94 calculates a first norm threshold $V_{a\_th1}$ based on a first modulation rate threshold Ma11. The first modulation rate threshold $M_{th1}$ is a threshold determined for the modulation rate M in the PWM control, and represents a modulation rate M serving as a reference for switching the control mode from the voltage phase control to the current vector control. The first norm threshold $V_{a\_th1}$ is a threshold to be compared with an averaged voltage norm command value $V_{a\_fin\_flt}*$ described later, and is used as a condition for switching from the voltage phase control to the current vector control. The first norm threshold $V_{a\_th1}$ is calculated by using the DC voltage $V_{dc}$ of the battery 15 according to a first formula of the following Equation (13).

The second norm threshold calculation unit 95 calculates a second norm threshold $V_{a\_th2}$ based on a second modulation rate threshold $M_{th2}$. The second modulation rate threshold $M_{th2}$ is a threshold determined for the modulation rate M in the PWM control, and represents a modulation rate M serving as a reference for switching the control mode from the current vector control to the voltage phase control. The second norm threshold $V_{a\_th2}$ is a threshold to be compared with the averaged voltage norm command value $V_{a\_fin\_flt}*$ described later, and is used as a condition for switching from the current vector control to the voltage phase control. The second norm threshold $V_{a\_th2}$ is calculated by using the DC voltage $V_{dc}$ of the battery 15 according to a second formula of the following Equation (13).

[Equation 13]
$$\begin{cases} V_{a\_th1} = \dfrac{V_{dc}}{\sqrt{2}} M_{th1} \\ V_{a\_th2} = \dfrac{V_{dc}}{\sqrt{2}} M_{th2} \end{cases} \tag{13}$$

In the present embodiment, a magnitude relationship between an upper limit value $M_{max}*$ of the modulation rate M, the first modulation rate threshold $M_{th1}$, and the second modulation rate threshold $M_{th2}$ is as shown in the following Equation (14). That is, the first modulation rate threshold $M_{th1}$ related to the switching from the voltage phase control to the current vector control is the smallest among them. The second modulation rate threshold $M_{th2}$ related to the switching from the current vector control to the voltage phase control is a value between the upper limit value $M_{max}*$ and the first modulation rate threshold $M_{th1}$. That is, in the present embodiment, the first modulation rate threshold $M_{th1}$ and the second modulation rate threshold $M_{th2}$ are at least different values. Therefore, the first norm threshold $V_{a\_th1}$ calculated by using the first modulation rate threshold $M_{th1}$ and the second norm threshold $V_{a\_th2}$ calculated by using the second modulation rate threshold $M_{th2}$ are also different values. As a result, hysteresis is provided for switching between the current vector control and the voltage phase control. In the present embodiment, since the switching between the current vector control and the voltage phase control is performed seamlessly, a phenomenon in which these switchings are repeated (so-called chattering) can be suppressed by providing the hysteresis in these switchings.

[Equation 14]

$$M_{max}* > M_{th2} > M_{th1} \quad (14)$$

The upper limit value $M_{max}*$ of the modulation rate M, the first modulation rate threshold Mail, and the second modulation rate threshold $M_{th2}$ are set as follows, for example. That is, the upper limit value $M_{max}*$ is a value of the modulation rate M in the rectangular wave state, i.e., "1.1". The second modulation rate threshold $M_{th2}$ is a value of the modulation rate M of a boundary between the non-overmodulation state and the overmodulation state, i.e., "1.0". The first modulation rate threshold $M_{th1}$ is a value of the modulation rate M that can be regarded as in the non-overmodulation state, i.e., "0.9".

The averaging filter 96 reduces noise of the d-axis final voltage command value $V_{d\_fin}*$ by averaging the d-axis final voltage command value $V_{d\_fin}*$. The averaging filter 96 is, for example, a low-pass filter (LPF). An output of the averaging filter 96 is an averaged d-axis final voltage command value $V_{d\_fin\_flt}*$. The averaged d-axis final voltage command value $V_{d\_fin\_flt}*$ is input to the norm calculation unit 98.

The averaging filter 97 reduces noise of the q-axis final voltage command value $V_{q\_fin}*$ by averaging the q-axis final voltage command value $V_{q\_fin}*$. The averaging filter 97 is, for example, a low-pass filter (LPF). An output of the averaging filter 97 is an averaged q-axis final voltage command value $V_{q\_fin\_flt}*$. The averaged q-axis final voltage command value $V_{q\_fin\_flt}*$ is input to the norm calculation unit 98.

The norm calculation unit 98 calculates the averaged voltage norm command value $V_{a\_fin\_flt}*$ by using the averaged d-axis final voltage command value $V_{d\_fin\_flt}*$ and the averaged q-axis final voltage command value $V_{q\_fin\_flt}*$ according to the following Equation (15). Specifically, the norm calculation unit 98 calculates the averaged voltage norm command value $V_{a\_fin\_flt}*$ according to the following Equation (15). The averaged voltage norm command value $V_{a\_fin\_flt}*$ is input to the control mode determination unit 99.

[Equation 15]

$$V_{a\_fin\_flt}* = \sqrt{V_{d\_fin\_flt}*^2 + V_{q\_fin\_flt}*^2} \quad (15)$$

The output controller 3 may output the d-axis voltage command value $V_{dv\_fin}*$ and the q-axis voltage command value $V_{qv\_fin}*$ in the voltage phase control as the d-axis final voltage command value $V_{d\_fin}*$ and the q-axis final voltage command value $V_{q\_fin}*$. In this case, instead of the above averaged voltage norm command value $V_{a\_fin\_flt}*$, a final voltage norm command value $V_{a\_fin}*$ input to the vector conversion unit 49 may be input to the control mode determination unit 99.

The control mode determination unit 99 determines a control mode to be applied according to the operating state of the electric motor 9 by using the first norm threshold $V_{a\_th1}$, the second norm threshold $V_{a\_th2}$, and the averaged voltage norm command value $V_{a\_fin\_flt}*$. A determination result of the control mode determination unit 99 is output as the control mode signal Sm to the current vector control unit 1, the voltage phase control unit 2, and the output controller 3.

Figure 7:
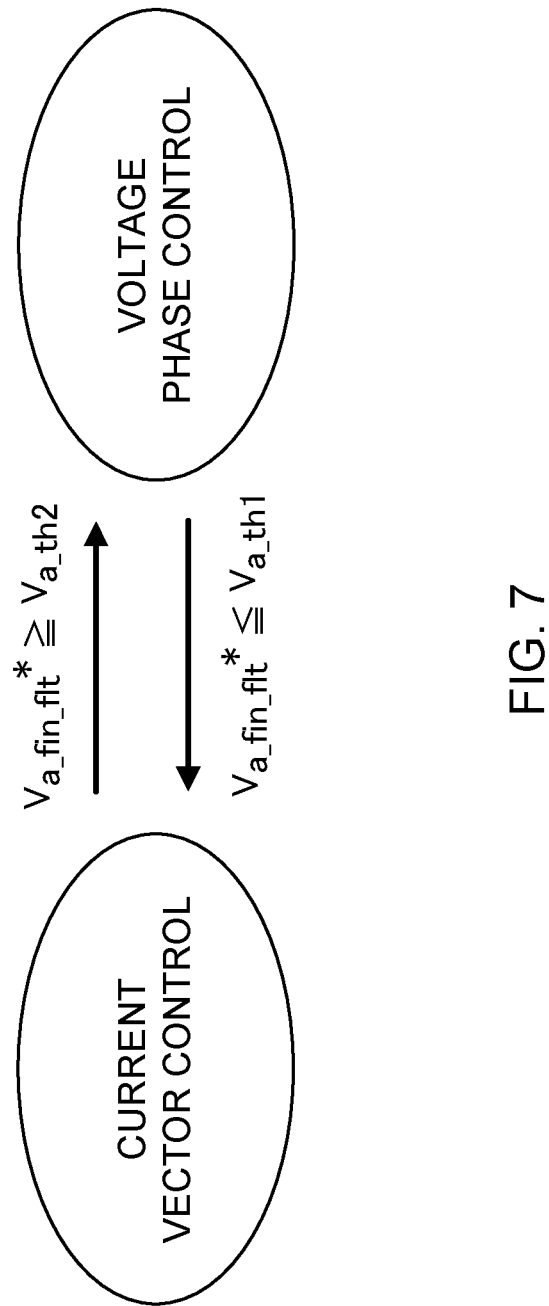
FIG. 7 is a diagram illustrating a control mode determination method performed by a control mode determination unit.

FIG. 7 is a diagram illustrating a control mode determination method performed by the control mode determination unit 99. As illustrated in FIG. 7, the control mode determination unit 99 compares the averaged voltage norm command value $V_{a\_fin\_flt}*$ with the first norm threshold $V_{a\_th1}$ and the second norm threshold $V_{a\_th2}$. As a result of the comparison, when it is detected that the averaged voltage norm command value $V_{a\_fin\_flt}*$ is equal to or smaller than the first norm threshold $V_{a\_th1}$ when the electric motor 9 is controlled by the voltage phase control, the switching to the current vector control is determined based on the detection result. Then, the control mode signal Sm (for example, a control mode switching command) indicating the above is output. In addition, when it is detected that the averaged voltage norm command value $V_{a\_fin\_flt}*$ is equal to or larger than the second norm threshold $V_{a\_th2}$ when the electric motor 9 is controlled by the voltage phase control, the switching to the voltage phase control is determined based on the detection result. Then, the control mode signal Sm indicating the above is output.

[Specific Configuration of Output Controller]

Figure 8:
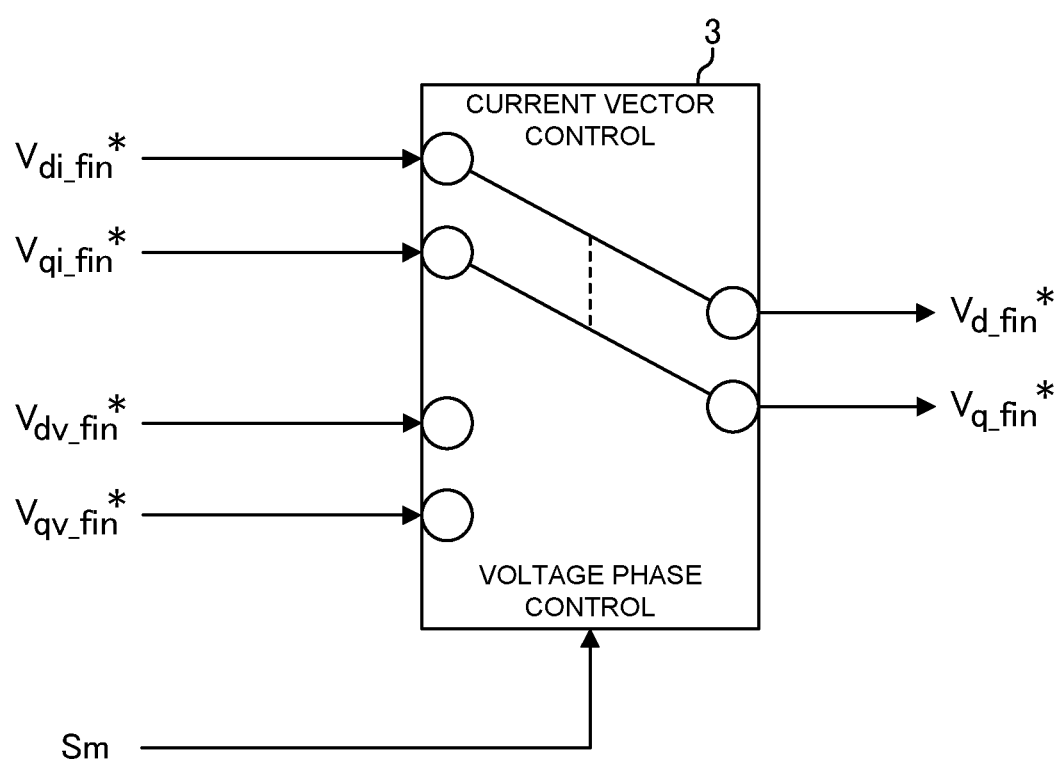
FIG. 8 is a block diagram illustrating a configuration of an output controller.

FIG. 8 is a block diagram illustrating a configuration of the output controller 3. FIG. 8 illustrates a switch that switches the control mode between the current vector control and the voltage phase control according to the control mode signal Sm. When the control mode is set to the current vector control based on the control mode signal Sm, the output controller 3 outputs the d-axis voltage command value $V_{di\_fin}*$ in the current vector control as the d-axis final voltage command value $V_{d\_fin}*$. At the same time, the output controller 3 outputs the q-axis voltage command value $V_{qi\_fin}*$ in the current vector control as the q-axis final voltage command value $V_{q\_fin}*$. On the other hand, when the control mode is set to the voltage phase control based on the control mode signal Sm, the output controller 3 outputs the d-axis voltage command value $V_{dv\_fin}*$ in the voltage phase control as the d-axis final voltage command value $V_{d\_fin}*$. At the same time, the output controller 3 outputs the q-axis voltage command value $V_{qv\_fin}*$ in the voltage phase control as the q-axis final voltage command value $V_{q\_fin}*$.

Effect of Present Embodiment

Effects of the electric motor system 100 and the electric motor 9 according to the present embodiment configured as described above will be described below.

Figure 9:
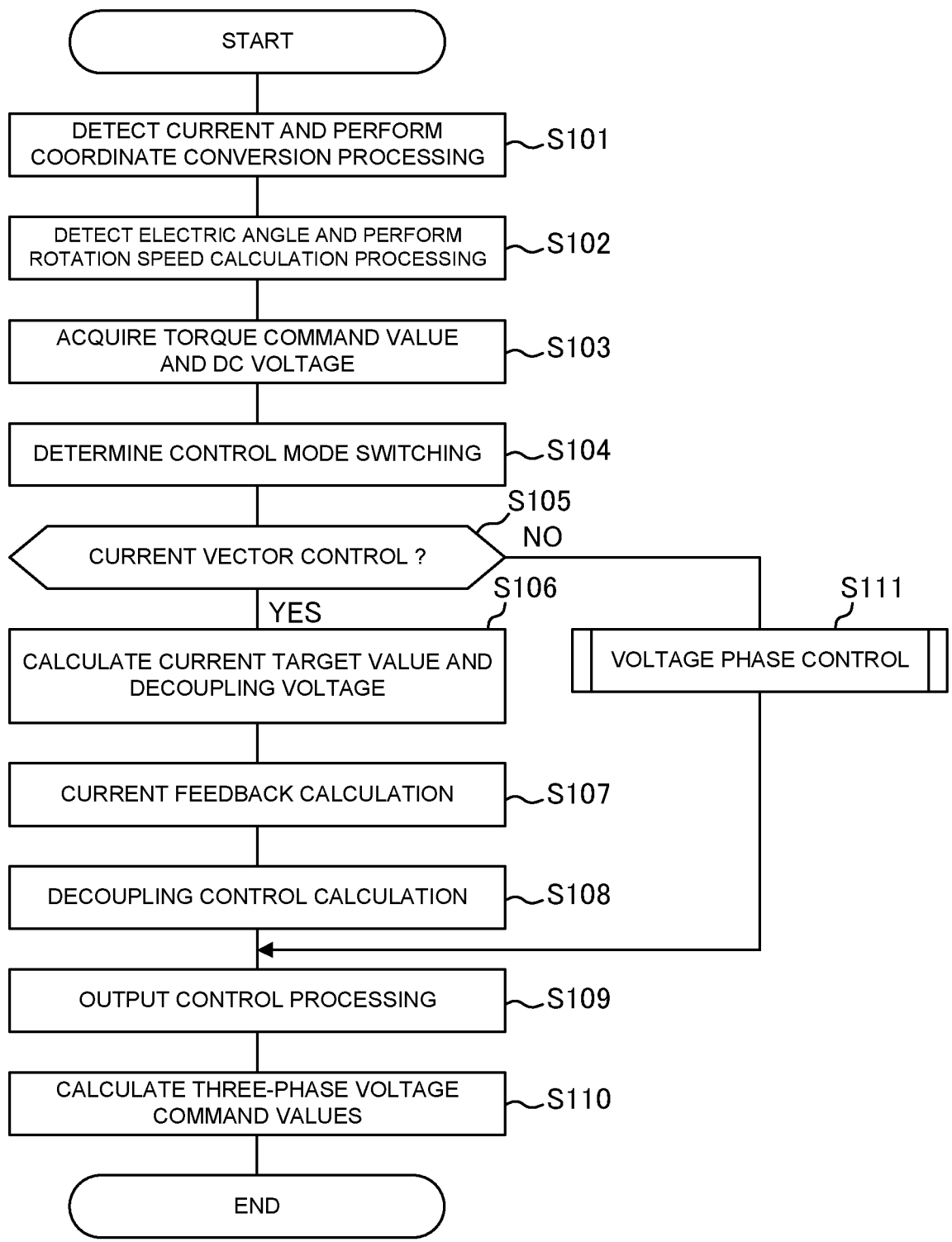
FIG. 9 is a flowchart of electric motor control according to the present embodiment.

FIG. 9 is a flowchart of electric motor control according to the present embodiment. As illustrated in FIG. 9, first, in step S101, the three-phase AC currents of the electric motor 9 are detected by the current detector 8, and the detected three-phase AC currents are converted into the d-axis current $i_d$ and the q-axis current $i_q$ by coordinate conversion processing of the converter 12. In step S102, the electric angle θ of the electric motor 9 is detected by the rotor detector 10, and the rotation speed N is calculated based on the detected electric angle θ by rotation speed calculation processing of the rotation speed calculator 11. In step S103, the torque target value T* is acquired, and the DC voltage $V_{dc}$ of the battery 15 is also acquired. That is, various parameters necessary for the control of the electric motor 9 are acquired or calculated.

When the various parameters are acquired in this way, in step S104, control mode switching determination is performed by the control mode switching determination unit 13. In step S105, when it is determined that a result of the control mode switching determination is to control the electric motor 9 by the current vector control, step S106 and subsequent steps are executed. In step S106, the d-axis current target value $i_d^*$, the q-axis current target value $i_q^*$, and the decoupling voltage $V_{d\_dcpl}^*$ are calculated by the current vector control unit 1. Thereafter, in step S107, the d-axis current feedback voltage command value $V_{di}'$ and a q-axis current feedback voltage command value $V_{qi}'$ are calculated by current feedback processing of feeding back the d-axis current target value $i_d^*$ and the q-axis current target value $i_q^*$, respectively. Further, in step S108, the d-axis voltage command value $V_{di\_fin}^*$ in the current vector control is calculated by performing decoupling control in which the decoupling voltage $V_{d\_dcpl\_flt}$ processed by the LPF 22 and the current feedback voltage command value $V_{di}'$ are added. In step S108, the q-axis voltage command value $V_{qi\_fin}^*$ in the current vector control is similarly calculated.

When the d-axis voltage command value $V_{di\_fin}^*$ and the q-axis voltage command value $V_{qi\_fin}^*$ in the current vector control are calculated in this way, the three-phase voltage command values are calculated by the converter 4 in step S110 through output control processing performed by the output controller 3 in step S109. Thereafter, the PWM signal based on the three-phase voltage command values is generated by the pulse width modulation signal generator 5, and the control of the electric motor 9 by the pulse width modulation is executed.

On the other hand, as a result of the control mode switching determination in step S104, when it is determined in step S105 that the operating state of the electric motor 9 is not suitable for the current vector control, the current phase control is executed in step S111.

Figure 10:
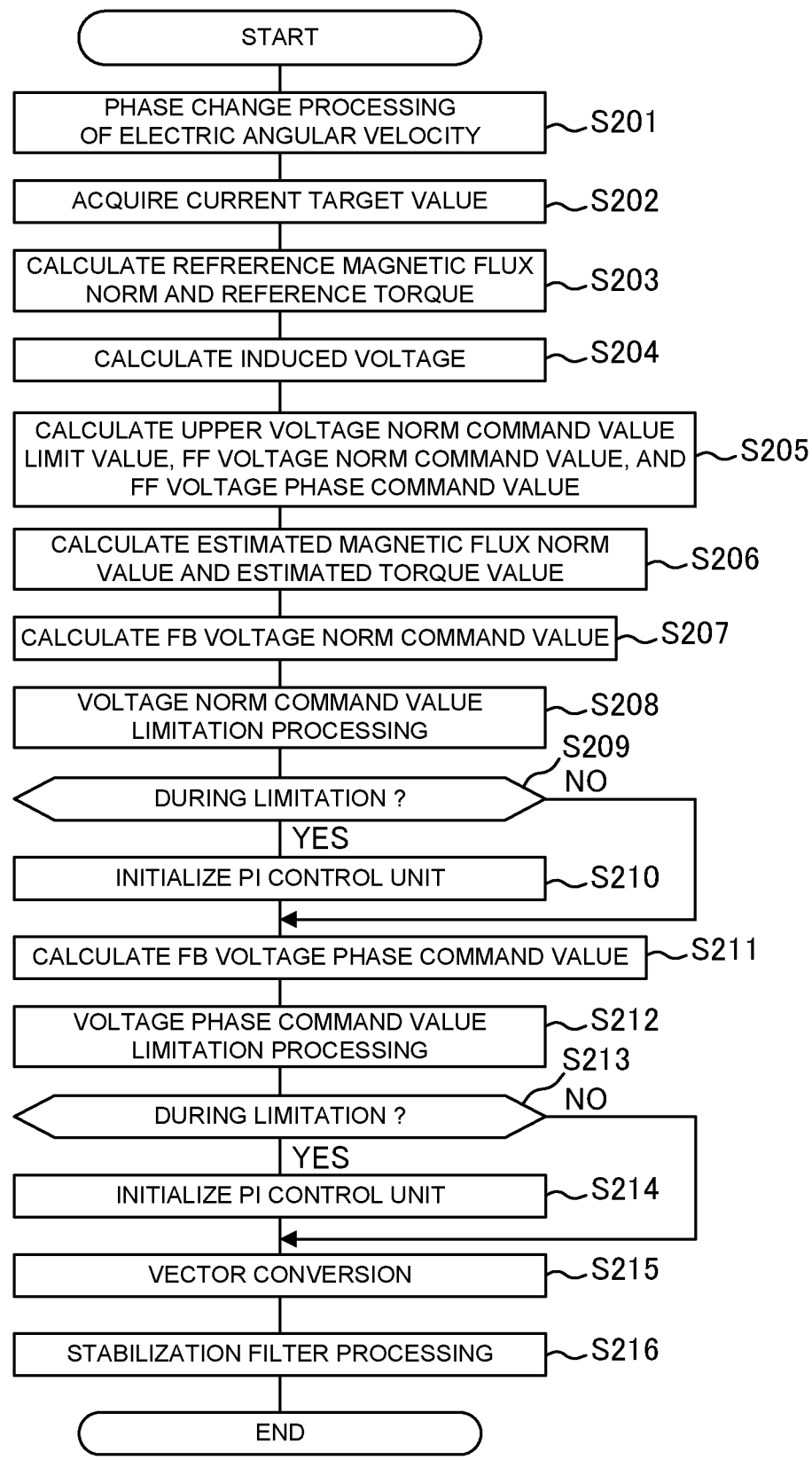
FIG. 10 is a flowchart of the voltage phase control.

FIG. 10 is a flowchart of the voltage phase control. As illustrated in FIG. 10, in the voltage phase control, the phase change processing of the electric angular velocity $\omega_e$ is executed in step S201. In step S202, the d-axis current target value $i_d^*$ and the q-axis current target value $i_q^*$ are acquired from the current vector control unit 1. In step S203, the reference magnetic flux norm $\varphi_{0\_ref}$ and the reference torque $T_{ref}$ are calculated.

Thereafter, in step S204, the induced voltage $V_{a0}$ is calculated based on the electric angular velocity $|\omega_e'|$ after the phase change processing and the reference magnetic flux norm $\varphi_{0\_ref}$. Then, in step S205, the upper voltage norm limit value $V_{a\_upper}$, the FF voltage norm command value $V_{a\_ff}$, and the FF voltage phase command value $\alpha_{ff}$ are calculated. In step S206, the estimated magnetic flux norm value $\varphi_{0\_est}$ and the estimated torque value $T_{est}$ are calculated by using the d-axis current target value $i_d^*$ and the q-axis current target value $i_q^*$. Then, in step S207, the FB voltage norm command value $V_{a\_fb}$ is calculated.

Next, the voltage norm command value $V_a^*$ is calculated by adding the FF voltage norm command value $V_{a\_ff}$ and the FB voltage norm command value $V_{a\_fb}$. In step S208, the voltage norm command value $V_a^*$ calculated in this way is limited to the value between the predetermined lower limit value and the upper voltage norm limit value $V_{a\_upper}$.

In step S209, when the voltage norm command value $V_a^*$ is limited by the voltage norm limitation processing, step S210 is executed, and the PI control unit 39 is initialized. On the other hand, in step S209, when the voltage norm command value $V_a^*$ is not limited by the above voltage norm limitation processing, step S210 is omitted. As a result, the voltage norm command value $V_a^*$ after the voltage norm limitation processing is input to the vector conversion unit 49.

On the other hand, in step S211, the FB voltage phase command value $\alpha_{fb}$ is calculated. Next, the voltage phase command value $\alpha^*$ is calculated by adding the FF voltage phase command value $\alpha_{ff}$ and the FB voltage phase command value $\alpha_{fb}$. In step S212, the voltage phase command value $\alpha^*$ calculated in this way is subjected to the voltage phase limitation processing. In step S213, when the voltage phase command value $\alpha^*$ is limited by the voltage phase limitation processing, the PI control unit 46 is initialized in step S214. On the other hand, when the voltage phase command value $\alpha^*$ is not limited by the voltage phase limitation processing in step S213, step S214 is omitted. As a result, the voltage phase command value $\alpha^*$ after the phase limitation processing is input to the vector conversion unit 49.

In step S215, the vector conversion unit 49 converts the voltage norm command value $V_a^*$ and the voltage phase command value $\alpha^*$ into the d-axis voltage command value $V_{dv}^*$ and the q-axis voltage command value $V_{qv}^*$. Then, the d-axis voltage command value $V_{dv}^*$ and the q-axis voltage command value $V_{qv}^*$ are output through stabilization filter processing in step S216. Thereafter, as in the current vector control, as illustrated in FIG. 9, the three-phase voltage command values are calculated by the converter 4 in step S110 through the output control processing by the output controller 3 in step S109. Then, the PWM signal based on the three-phase voltage command values is generated by the pulse width modulation signal generator 5, and the control of the electric motor 9 by the pulse width modulation is executed.

As described above, in the voltage phase control of the present embodiment, the electric motor 9 may be controlled in the overmodulation state depending on the operating state. In addition, when the rotation speed N is detected, the rotation speed N is converted into the electric angular velocity $\omega_e$. Then, in the command value calculation in the voltage phase control, the electric angular velocity $\omega_e$ is used. However, instead of using the electric angular velocity $\omega_e$ corresponding to the detected rotation speed N as it is, the phase change processing is executed in consideration of the required time $T_s$ with respect to the electric angular velocity $\omega_e$. Therefore, in the voltage phase control of the present embodiment, the calculation of the final command value according to the command value calculation model in the voltage phase control is executed by using the electric angular velocity $|\omega_e'|$ after the phase change processing. As a result, in the voltage phase control of the present embodiment, the electric motor 9 can be appropriately controlled regardless of the operating situation. That is, according to the voltage phase control of the present embodiment, as will be described below, it is possible to appropriately prevent an overcurrent that is a concern in a scene in which the voltage applied to the electric motor 9 is neither excessive nor deficient and the rotation speed N of the electric motor 9 suddenly changes when the electric motor 9 is controlled in the overmodulation state.

Figure 11:
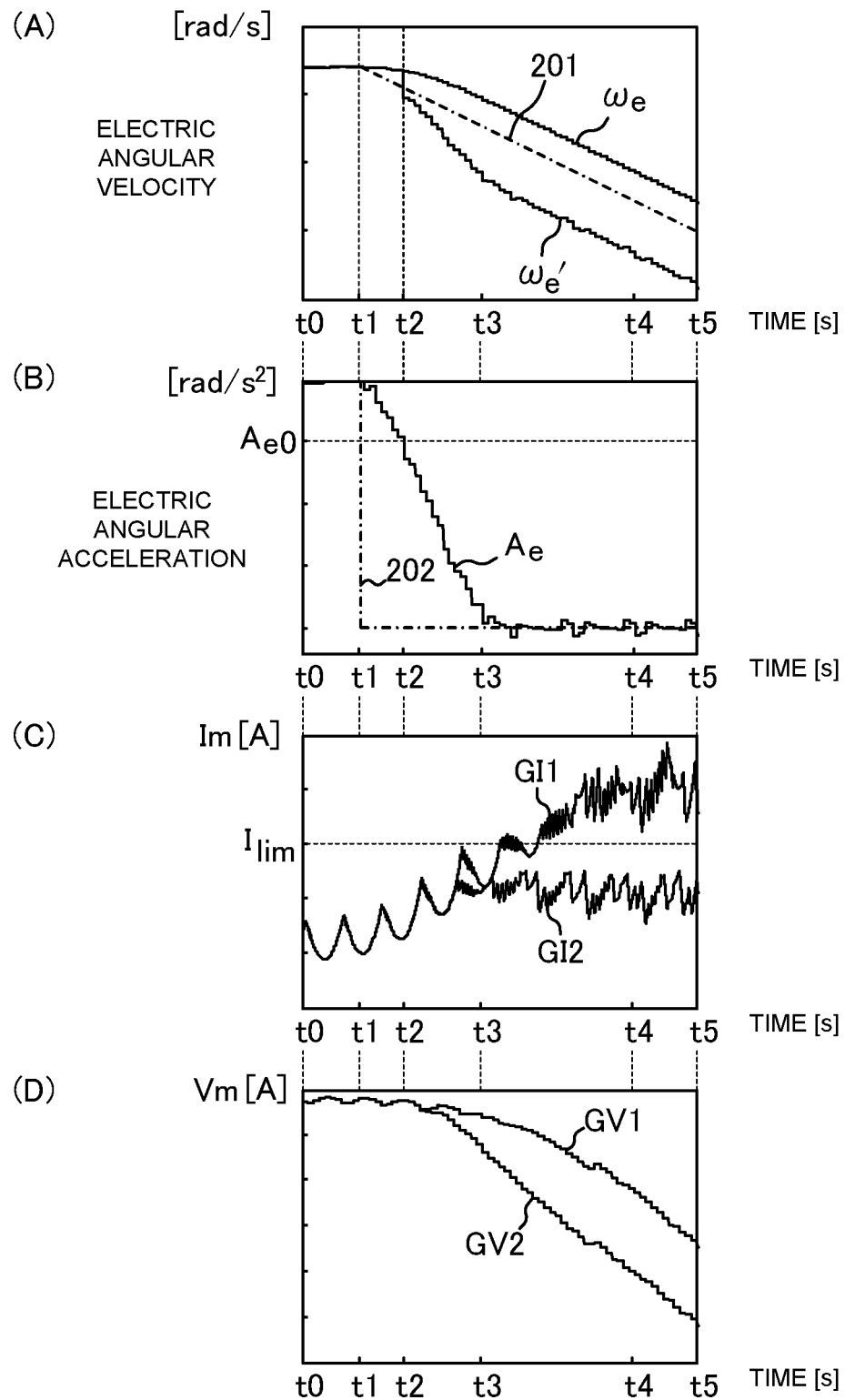
FIG. 11 is a graph illustrating (A) an electric angular velocity, (B) an electric angular acceleration, (C) a current flowing through an electric motor, and (D) a voltage applied to the electric motor.

FIG. 11 is a graph illustrating (A) the electric angular velocity $\omega_e$, (B) the electric angular acceleration $A_e$, (C) a current Im flowing through the electric motor 9, and (D) a voltage Vm applied to the electric motor 9. FIG. 11 illustrates parameters in situations where the electric motor 9 is controlled in the overmodulation state by the voltage phase control over the entire period from a time point t0 to a time point t5. In addition, during the period from the time point t0 to the time point t1, the electric motor 9 is operated at a constant rotation speed N, and the rotation speed N suddenly decreases from the time point t1. The current Im flowing through the electric motor 9 is, for example, the d-axis current $i_d$, the q-axis current $i_q$, or a square average of the d-axis current $i_d$ and the q-axis current $i_q$. In addition, the voltage Vm applied to the electric motor 9 is a voltage norm corresponding to the d-axis voltage command value $V_{dv\_fin}*$ and the q-axis voltage command value $V_{qv\_fin}*$.

As illustrated in (A) in FIG. 11, the electric angular velocity $\omega_e$ obtained by converting the detected rotation speed N (detected electric angular velocity) deviates from an actual angular velocity (hereinafter, referred to as an actual angular velocity) 201 of the electric motor 9 after the time point t1 at which the rotation speed N suddenly decreases. This is because, as the rotation speed N of the electric motor 9 suddenly decreases, a slight response delay of about the required time $T_s$ has an influence that cannot be ignored for the control of the electric motor 9.

As indicated by an alternate long and short dash line in (B) in FIG. 11, as the rotation speed N suddenly decreases from the time point t1, an actual electric angular acceleration (hereinafter referred to as an actual angular acceleration) 202 of the electric motor 9 decreases stepwise at the time point t1. At this time, as indicated by a solid line in (B) in FIG. 11, the electric angular acceleration $A_e$ obtained by differentiating the electric angular velocity $\omega_e$ (detected electric angular velocity) is delayed in tracking due to the required time $T_s$. Therefore, the electric angular acceleration $A_e$ substantially matches the actual angular acceleration 202 at the time point t3.

Therefore, in the voltage phase control of the present embodiment, the phase of the electric angular velocity $\omega_e$ is changed in consideration of the required time $T_s$. The phase change of the electric angular velocity $\omega_e$ is performed after the time point t2 at which the detected electric angular acceleration $A_e$ is compared with the threshold $A_{e0}$ and the electric angular acceleration $A_e$ is smaller than the threshold $A_{e0}$. As a result, as illustrated in (A) in FIG. 11, the electric angular velocity $|\omega_e'|$ after the phase change decreases from the time point t2 with respect to the detected electric angular velocity $\omega_e$. In addition, as illustrated in (A) in FIG. 11, the electric angular velocity $|\omega_e'|$ after the phase change further decreases from a detected electric angular velocity $\omega_e$ side beyond the actual electric angular velocity 201. This is because the phase change is performed in consideration of the required time $T_s$. That is, the phase change executed in the voltage phase control of the present embodiment is not a correction or compensation for matching the detected electric angular velocity $\omega_e$ with the actual electric angular velocity 201, but is a change of advancing the phase more than the actual electric angular velocity 201. As illustrated in (A) in FIG. 11, in the present embodiment, the phase of the electric angular velocity $|\omega_e'|$ after the phase change is substantially advanced from the time point t3 to the time point t4 with respect to the actual electric angular velocity 201.

When the phase of the electric angular velocity $\omega_e$ is changed in this way and the electric angular velocity $|\omega_e'|$ after the phase change is used for the command value calculation in the voltage phase control, the current Im flowing through the electric motor 9 is suppressed to be equal to or smaller than an upper limit value of the current that can flow to the electric motor 9 (hereinafter referred to as an upper current limit $I_{lim}$). Specifically, as illustrated in a graph GI1 in (C) in FIG. 11, when the command value calculation in the voltage phase control is performed by using the detected electric angular velocity $\omega_e$ without changing the phase, the current flowing through the electric motor 9 continues to increase even after the time point t3 at which the electric angular acceleration $A_e$ is settled to the actual angular acceleration 202. As a result, the current flowing through the electric motor 9 becomes an overcurrent exceeding the upper current limit $I_{lim}$. On the other hand, as illustrated in a graph GI2 in (C) in FIG. 11, when the final command value is calculated according to the command value calculation model in the voltage phase control by using the electric angular velocity $\omega_e$ after the phase change, the current flowing through the electric motor 9 after the time point t3 is suppressed from increasing and exhibits a generally flat transition. Therefore, the current flowing through the electric motor 9 does not exceed the upper current limit $I_{lim}$. The upper current limit $I_{lim}$ is determined in advance according to durability and the like of the electric motor 9.

As illustrated in a graph GV1 in (D) in FIG. 11, when the final command value is calculated according to the command value calculation in the voltage phase control by using the detected electric angular velocity $\omega_e$ without changing the phase, a decrease of the voltage Vm applied to the electric motor 9 is gradual even though the rotation speed N suddenly decreases. This is one of reasons why the current flowing through the electric motor 9 continues to increase as described above (see graph GI1). On the other hand, as illustrated in a graph GV2 in (C) in FIG. 11, when the command value calculation in the voltage phase control is performed by using the electric angular velocity $\omega_e$ after the phase change, the voltage Vm applied to the electric motor 9 is decreased more quickly than in the graph GV1. Accordingly, the increase in the current flowing through the electric motor 9 is suppressed (see graph GI2).

The phase change processing is included in the voltage phase control. That is, instead of adding a change to the result of the command value calculation in the voltage phase control, the voltage applied to the electric motor 9 is appropriately adjusted in a state including the phase change processing in the voltage phase control. Therefore, in FIG. 11, transition of each parameter when the rotation speed N suddenly decreases has been described. When the rotation speed N changes gradually, naturally, the electric motor 9 is appropriately controlled without causing the excess or deficiency of the voltage or the like due to the voltage phase control.

In the phase change of the electric angular velocity $\omega_e$ performed in the present embodiment, the phase is advanced more than the actual electric angular velocity 201. However, in order to prevent an adverse effect caused by excessively advancing the phase, the phase of the electric angular velocity $\omega_e$ is advanced in a range that does not exceed the change amount that can be generated in the electric angular velocity $\omega_e$ per required time $T_s$. That is, the change amount of the phase of the electric angular velocity $\omega_e$ is set to be within a range of a delay time that is included from the detection of the rotation speed N to the application of the voltage to the electric motor 9. For example, in an ideal system in which the required time $T_s$ is completely zero, if the voltage to be applied to the electric motor 9 can be output without a delay, the overcurrent can be suppressed, which cannot be achieved. On the other hand, if an excessive phase change is performed to exceed the delay time included in the system, the excess or deficiency of the voltage occurs, and a risk of an overcurrent may increase. Therefore, as described above, the phase change processing is preferably performed only within the range of the delay time included in the system.

In the above embodiment, the electric angular velocity $\omega_e$ is used for the command value calculation in the voltage phase control, and the command value calculation using the rotation speed N may be set without converting to the electric angular velocity $\omega_e$. In this case, similar to the above embodiment, the phase change processing is performed on the rotation speed N. That is, the phase change of the electric angular velocity $\omega_e$ is an example of the change of the rotation speed N. Similarly, the above phase change processing can be performed on a rotation speed parameter other than the rotation speed N or the electric angular velocity $\omega_e$. That is, instead of performing the phase change processing on the rotation speed N or the electric angular velocity $\omega_e$, the phase change processing may be performed on a rotation speed parameter having a correlation with the rotation speed N or the electric angular velocity $\omega_e$. For example, when the induced voltage $V_{a0}$ is calculated by using the electric angular velocity $\omega_e$ before the phase change, the phase change processing may be performed on the induced voltage $V_{a0}$.

In the above embodiment, the required time $T_s$ is estimated by using the wasted time related to the detection of the rotation speed N and the time constant $\tau_m$ of the stabilization filter 50 (see Equation (12)), which is an example of the required time $T_s$. For example, a plurality of delay elements that can be considered in design can be selected and taken into consideration for the required time $T_s$. For example, in addition to the above, the required time $T_s$ can be set by using some or all of a sampling period of the electric angle $\theta$, a calculation period of the rotation speed N, a wasted time generated in the pulse width modulation, a wasted time related to the output of the PWM pulse, a response delay included in the phase change unit 32 itself, and the like.

In addition, the various constants in the above embodiment can be changed to variables. For example, various constants in the above embodiment can be varied according to various parameters related to the operating states of the electric motor 9 and the inverter 6, such as the current, the rotation speed N, the torque, the voltage, or the temperature. When a risk such as a failure of hardware due to an overcurrent is high, various constants may be varied such that a correction amount of the phase change in the above embodiment increases.

In the above embodiment, the change limitation unit 52 compares the electric angular acceleration $A_e$ with the threshold $A_{e0}$, and determines whether to change the phase of the electric angular velocity $\omega_e$ (see FIG. 5). In the determination, when the threshold $A_{e0}$ is set to zero, the phase change processing is substantially not performed when the rotation speed N increases, and the phase change processing is performed only when the rotation speed N decreases. The risk of an overcurrent is greater when the rotation speed N decreases than when the rotation speed N increases. Therefore, when the threshold $A_{e0}$ is set to zero, the phase change processing is accurately performed only in a scene in which the risk of an overcurrent is high, and thus the risk of an overcurrent is efficiently reduced. In addition, when the threshold $A_{e0}$ is set to zero, in a scene in which the rotation speed N increases, original voltage phase control in which the phase change processing is not performed is maintained. Therefore, in the scene in which the rotation speed N increases, original responsiveness of the voltage phase control is maintained. As a result, the phase change processing is performed by an excessive temporary voltage, and control efficiency of the electric motor 9 is prevented from deteriorating. This is an example of a case where the change amount of the phase change processing (phase change amount $\omega_{ecmp}$) when an absolute value of the rotation speed N decreases is larger than the change amount of the phase change processing (phase change amount $\omega_{ecmp}$) when the absolute value of the rotation speed N increases.

When the threshold $A_{e0}$ is set to a predetermined negative value determined in advance according to the characteristics of the electric motor 9 or the like, the phase change processing is substantially not performed at the time of a slow acceleration or deceleration. Then, the phase change processing is appropriately performed only at the time of a sudden acceleration or deceleration in which the risk of an overcurrent is high. Therefore, when the threshold $A_{e0}$ is set to a predetermined negative value, the overcurrent is efficiently prevented only at the time of a sudden acceleration or deceleration, such as a case where wheels of a vehicle equipped with the electric motor system 100 slip, a case where the wheels grip again on a road surface after slipping, or a case where the wheels are locked. In addition, at the time of a slow acceleration or deceleration assumed in a normal driver operation, the original responsiveness of the voltage phase control in which the phase change processing is not performed is maintained. Therefore, the phase change processing is performed by an excessive temporary voltage, and the control efficiency of the electric motor 9 is prevented from deteriorating.

Figure 12:
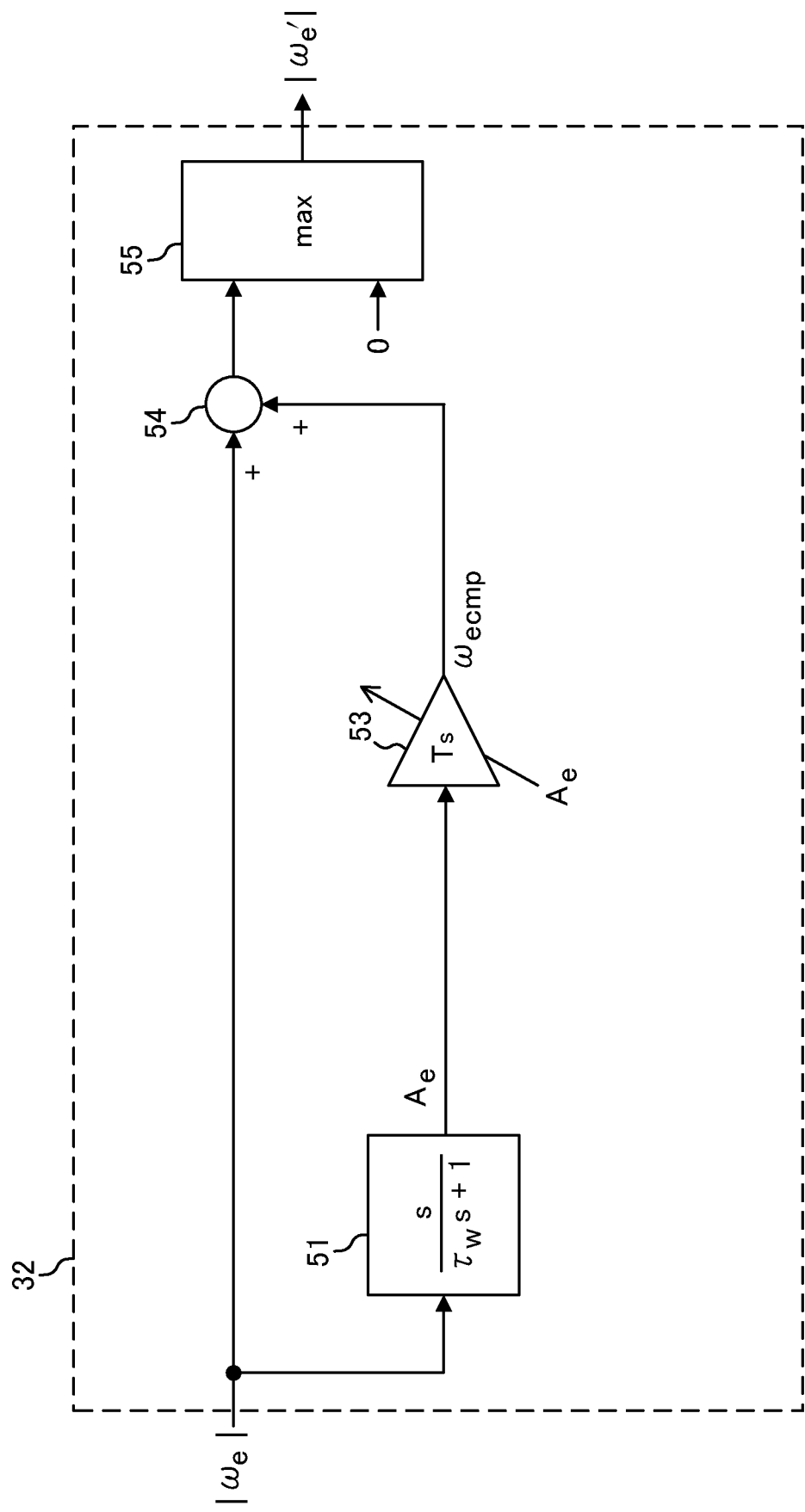
FIG. 12 is a block diagram illustrating a configuration of a phase change unit according to a modification.

In the above embodiment, the change limitation unit 52 compares the electric angular acceleration $A_e$ with the threshold $A_{e0}$, and determines whether to change the phase of the electric angular velocity $\omega_e$, but the change limitation unit 52 may be omitted. FIG. 12 is a block diagram illustrating a configuration of the phase change unit 32 according to a modification. As illustrated in FIG. 12, in the phase change unit 32, the change limitation unit 52 is omitted and the phase change amount calculation unit 53 is variable according to the electric angular acceleration $A_e$. Specifically, the phase change amount calculation unit 53 according to the present modification calculates the phase change amount $\omega_{ecmp}$ by, for example, multiplying the product of the required time $T_s$ and the electric angular acceleration $A_e$ by a coefficient γ (not illustrated) according to the electric angular acceleration $A_e$. If the coefficient γ is set to "0" when the electric angular acceleration $A_e$ is positive and is set to "1" when the electric angular acceleration $A_e$ is negative, the coefficient functions similarly to the case of setting the threshold $A_{e0}$ to zero in the above embodiment. In addition, if the coefficient γ is set to "0" when the electric angular acceleration $A_e$ is larger than a predetermined negative value and is set to "1" when the electric angular acceleration $A_e$ is equal to or smaller than the predetermined negative value, the coefficient functions similarly to the case of setting the threshold $A_{e0}$ to a predetermined negative value in the above embodiment.

Further, as described above, when the change limitation unit 52 is omitted and the phase change amount calculation unit 53 is variable according to the electric angular acceleration $A_e$, the electric motor 9 is controlled more flexibly and appropriately.

For example, "a coefficient γ whose value increases as the electric angular acceleration $A_e$ decreases" can be set such that the coefficient γ when the rotation speed N increases is smaller than the coefficient γ when the rotation speed N decreases. In this case, the phase change amount $\omega_{ecmp}$ at the time of a deceleration is larger than the phase change amount $\omega_{ecmp}$ at the time of acceleration. Therefore, it is easy to appropriately achieve both the prevention of the overcurrent and the maintenance of the original responsiveness of the voltage phase control according to the operating state of the electric motor 9. This is an example of the case where the change amount of the phase change processing (phase change amount $\omega_{ecmp}$) when an absolute value of the rotation speed N decreases is larger than the change amount of the phase change processing (phase change amount $\omega_{ecmp}$) when the absolute value of the rotation speed N increases.

For example, "a coefficient γ whose value decreases as the 'absolute value' of the electric angular acceleration $A_e$ decreases" can be set. In this case, the original responsiveness of the voltage phase control is maintained at the time of a slow acceleration or deceleration in which the absolute value of the electric angular acceleration $A_e$ is small, and the overcurrent is prevented at the time of a sudden acceleration or deceleration in which the absolute value of the electric angular acceleration $A_e$ is large.

As described above, the control method for the electric motor 9 in the present embodiment and/or the modification is a method of controlling the electric motor 9 that controls the electric motor 9 by the voltage phase control performed based on the voltage norm command value $V_a^*$ representing the magnitude of the voltage to be supplied to the electric motor 9 and the voltage phase command value α* representing the phase of the voltage. In the control method for the electric motor 9, the required time $T_s$ required for calculating the final command value (d-axis voltage command value $V_{dv\_fin}^*$ and q-axis voltage command value $V_{qv\_fin}^*$) of the voltage (voltage norm command value $V_a^*$) applied to the electric motor 9 by the voltage phase control according to the command value calculation model for calculation by using the rotation speed parameter (electric angular velocity $\omega_e$) related to the rotation speed N of the electric motor 9 is acquired. Then, the detected rotation speed parameter (electric angular velocity $\omega_e$) is changed based on the required time $T_s$. Thereafter, the final command value (d-axis voltage command value $V_{dv\_fin}^*$ and q-axis voltage command value $V_{qv\_fin}^*$) is calculated by using the changed rotation speed parameter (electric angular velocity $\omega_e$) according to the command value calculation model.

Accordingly, the control method for the electric motor 9 according to the present embodiment and/or the modification can appropriately control the electric motor 9 when the electric motor 9 is controlled in the overmodulation state by the voltage phase control. That is, the overcurrent is prevented when the rotation speed N of the electric motor 9 suddenly decreases. In addition, in the change of the rotation speed parameter, the command value calculation model or the final command value calculated according to the command value calculation model is not changed. That is, the command value calculation model includes the change of the rotation speed parameter, and is set to calculate an appropriate final command value including the change of the rotation speed parameter. Therefore, when the rotation speed N of the electric motor 9 gradually increases or decreases, the voltage applied to the electric motor 9 does not become excess or deficiency.

In the control method for the electric motor 9 according to the present embodiment and/or the modification, specifically, the rotational speed N is detected, and the rotational speed parameter is detected by calculating the electric angular velocity $\omega_e$ based on the rotational speed N. Then, the phase of the electric angular velocity $\omega_e$ is changed based on the required time $T_s$. Thereafter, the final command value (d-axis voltage command value $V_{dv\_fin}^*$ and q-axis voltage command value $V_{qv\_fin}^*$) is calculated by using the electric angular velocity $|\omega_e'|$ after the phase change and the command value calculation model.

In this way, when the electric angular velocity $\omega_e$ is detected as the rotation speed parameter and the electric angular velocity $|\omega_e'|$ after the phase change of the electric angular velocity $\omega_e$ is used for the calculation of the final command value according to the command value calculation model, the electric motor 9 is particularly controlled appropriately. This is because, when the phase of the electric angular velocity $\omega_e$ is changed among the plurality of rotation speed parameters that can be taken into consideration, other composite elements need not to be considered, and an overcurrent prevention effect is most directly facilitated.

Specifically, in the control method for the electric motor 9 according to the present embodiment and/or the modification, the phase of the electric angular velocity $\omega_e$ is changed such that the electric angular velocity $|\omega_e'|$ after the phase change approaches the electric angular velocity $\omega_e$ after the required time $T_s$ is elapsed. That is, instead of changing the phase such that the electric angular velocity $|\omega_e'|$ after the phase change approaches the actual electric angular velocity 201, the phase of the electric angular velocity $\omega_e$ is changed such that the electric angular velocity $|\omega_e'|$ after the phase change approaches the electric angular velocity $\omega_e$ predicted to be acquired after the required time $T_s$ is elapsed. By changing the phase of the electric angular velocity $\omega_e$ in this way, the electric motor 9 can be particularly controlled appropriately when the electric motor 9 is controlled in the overmodulation state by the voltage phase control.

In the control method for the electric motor 9 according to the present embodiment and/or the modification, the phase of the electric angular velocity $\omega_e$ is advanced based on the required time $T_s$. Therefore, a case where the phase of the electric angular velocity $\omega_e$ is advanced from the detected electric angular velocity $\omega_e$ side beyond the actual electric angular velocity 201 is included. Accordingly, when the electric motor 9 is controlled in the overmodulation state by the voltage phase control, the electric motor 9 can be particularly controlled appropriately.

In the control method for the electric motor 9 according to the present embodiment and/or the modification, the change amount (phase change amount $\omega_{ecmp}$) of the rotation speed parameter (electric angular velocity $\omega_e$) when the absolute value of the rotation speed N decreases is set to be larger than the change amount (phase change amount $\omega_{ecmp}$) of the rotation speed parameter (electric angular velocity $\omega_e$) when the absolute value of the rotation speed N increases. Accordingly, when the electric motor 9 is controlled in the overmodulation state by the voltage phase control, the electric motor 9 can be particularly controlled appropriately. For example, since the overcurrent is likely to occur at the time of a deceleration due to a sudden change in the rotation speed N, the risk of an overcurrent can be particularly effectively reduced by performing the phase change processing specialized in the deceleration. In addition, at the time of an acceleration, the original response without phase change is maintained, and the phase change processing is performed by an instantaneous voltage fluctuation or the like, so that the control efficiency is prevented from decreasing.

In the control method for the electric motor 9 according to the present embodiment and/or the modification, specifically, a temporal change (electric angular acceleration $A_e$) of the rotation speed parameter (electric angular velocity $\omega_e$) is calculated, and the temporal change (electric angular acceleration $A_e$) of the rotation speed parameter (electric angular velocity $\omega_e$) is compared with the predetermined threshold $A_{e0}$. Then, a change amount (phase change amount $\omega_{ecmp}$) of the change (phase change processing) when the temporal change (electric angular acceleration $A_e$) of the rotation speed parameter (electric angular velocity $\omega_e$) is smaller than the threshold $A_{e0}$ is set to be smaller than a change amount (phase change amount $\omega_{ecmp}$) of the change (phase change processing) when the temporal change (electric angular acceleration $A_e$) of the rotation speed parameter (electric angular velocity $\omega_e$) is equal to or larger than the threshold $A_{e0}$. Accordingly, when the electric motor 9 is controlled in the overmodulation state by the voltage phase control, the electric motor 9 can be particularly controlled appropriately. For example, since the phase change processing is performed only at the time of a sudden acceleration or deceleration such as slipping of wheels connected to the electric motor 9, the risk of an overcurrent can be effectively reduced. In addition, since the original response when the phase change processing is not performed is maintained at the time of a slow acceleration or deceleration, a risk of efficiency deterioration due to an excessive temporary voltage and a risk of controllability deterioration caused by amplification of the noise included in the detected rotation speed N and the voltage applied to the electric motor 9 becoming vibration can be reduced.

In the control method for the electric motor 9 according to the present embodiment and/or the modification, a temporal change (electric angular acceleration $A_e$) of the rotation speed parameter (electric angular velocity $\omega_e$) is calculated, the temporal change (electric angular acceleration $A_e$) of the rotation speed parameter (electric angular velocity $\omega_e$) is compared with the predetermined threshold $A_{e0}$, and the change (phase change processing) of the rotation speed parameter (electric angular velocity $\omega_e$) is substantially stopped when the temporal change (electric angular acceleration $A_e$) of the rotation speed N is smaller than the threshold $A_{e0}$. Accordingly, in the same way as described above, when the electric motor 9 is controlled in the overmodulation state by the voltage phase control, the electric motor 9 can be particularly controlled appropriately.

In the control method for the electric motor 9 according to the present embodiment and/or the modification, the change (phase change of the electric angular velocity $\omega_e$) of the rotation speed parameter (electric angular velocity $\omega_e$) is performed within a range that does not exceed the change amount of the rotation speed parameter (electric angular velocity $\omega_e$) per required time $T_s$. Accordingly, an excessive change can be prevented, and a risk that the risk of an overcurrent is high can be reduced.

Although the embodiment of the present invention has been described above, configurations described in the above embodiment and the modification are only a part of application examples of the present invention, and are not intended to limit the technical scope of the present invention.

The invention claimed is:

1. An electric motor control method for controlling an electric motor by voltage phase control performed based on a voltage norm command value representing a magnitude of a voltage to be supplied to the electric motor and a voltage phase command value representing a phase of the voltage, the method comprising:
   acquiring a required time required for calculating a final command value of a voltage applied to the electric motor by the voltage phase control according to a command value calculation model for calculation by using a rotation speed parameter related to a rotation speed of the electric motor;
   detecting the rotation speed parameter;
   changing the rotation speed parameter by advancing a phase of the rotation speed parameter based on the required time such that the rotation speed parameter approaches the rotation speed parameter after the required time is elapsed; and
   calculating the final command value by using the changed rotation speed parameter according to the command value calculation model.

2. The electric motor control method according to claim 1, wherein
   the rotation speed parameter is an electric angular velocity.

3. The electric motor control method according to claim 1, wherein
   setting a change amount of the rotation speed parameter when an absolute value of the rotation speed decreases to be larger than a change amount of the rotation speed parameter when the absolute value of the rotation speed increases.

4. The electric motor control method according to claim 1, wherein
   calculating a temporal change in the rotation speed parameter;
   comparing the temporal change in the rotation speed parameter with a predetermined threshold; and
   setting a change amount of the rotation speed parameter when the temporal change of the rotation speed parameter is smaller than the threshold to be smaller than a change amount of the rotation speed parameter when the temporal change of the rotation speed parameter is equal to or larger than the threshold.

5. The electric motor control method according to claim 1, wherein
   calculating a temporal change in the rotation speed parameter,
   comparing the temporal change in the rotation speed parameter with a predetermined threshold, and
   stopping to change the rotation speed parameter when the temporal change in the rotation speed parameter is smaller than the threshold.

6. The electric motor control method according to claim 1, wherein
   changing the rotation speed parameter within a range that does not exceed a change amount of the rotation speed parameter per the required time.

7. An electric motor system comprising:
   an electric motor; and
   a controller configured to control the electric motor by voltage phase control performed based on a voltage norm command value representing a magnitude of a voltage to be supplied to the electric motor and a voltage phase command value representing a phase of the voltage, wherein
   the controller is configured to
   acquire a required time required for calculating a final command value of a voltage applied to the electric motor by the voltage phase control according to a command value calculation model for calculation by using a rotation speed parameter related to a rotation speed of the electric motor, detect the rotation speed parameter, change the rotation speed parameter by advancing a phase of the rotation speed parameter based on the required time such that the rotation speed parameter approaches the rotation speed parameter after the required time is elapsed, and calculate the final command value by using the changed rotation speed parameter according to the command value calculation model.

* * * * *